(12) United States Patent
Takayanagi

(10) Patent No.: US 10,703,653 B2
(45) Date of Patent: Jul. 7, 2020

(54) LIQUID TREATMENT DEVICE UTILIZING PLASMA

(71) Applicant: Panasonic Intellectual Property Management Co., Ltd., Osaka (JP)

(72) Inventor: Tetsuya Takayanagi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 619 days.

(21) Appl. No.: 15/411,392

(22) Filed: Jan. 20, 2017

(65) Prior Publication Data
US 2017/0233267 A1    Aug. 17, 2017

(30) Foreign Application Priority Data

Feb. 17, 2016 (JP) .................................. 2016-028399
Dec. 26, 2016 (JP) .................................. 2016-251793

(51) Int. Cl.
*C02F 1/46* (2006.01)

(52) U.S. Cl.
CPC ........ *C02F 1/4608* (2013.01); *C02F 2303/04* (2013.01)

(58) Field of Classification Search
CPC .... C02F 2001/46171; C02F 2201/4619; C02F 2301/046; C02F 2303/26; C02F 1/46; C02F 1/48; B01J 19/08
See application file for complete search history.

(56) References Cited

U.S. PATENT DOCUMENTS

| 4,841,114 | A | 6/1989 | Browning |
| 2005/0189278 | A1 | 9/2005 | Iijima et al. |
| 2014/0054242 | A1* | 2/2014 | Imai ................. C02F 1/4608 210/748.17 |
| 2014/0231329 | A1 | 8/2014 | Imai et al. |
| 2015/0136711 | A1* | 5/2015 | Fujikane ............ C02F 1/4608 210/748.17 |

FOREIGN PATENT DOCUMENTS

| JP | 1-319297 | 12/1989 |
| JP | 5-023579 | 2/1993 |
| JP | 2005-296909 | 10/2005 |
| JP | 2015-033694 | 2/2015 |
| JP | 2015-136644 | 7/2015 |

* cited by examiner

*Primary Examiner* — Cameron J Allen
(74) *Attorney, Agent, or Firm* — McDermott Will & Emery LLP

(57) ABSTRACT

A liquid treatment device comprises: a first insulator including a first opening and a first inner surface, a gas being emitted into a subject liquid through the first opening; a first electrode that is at least partially disposed within a first space surrounded by the first inner surface; a second electrode that is at least partially disposed within the subject liquid; a gas supply source; and a power supply source. The first inner surface includes a first partial region which contacts the first opening. A forward end of the first electrode protrudes from the first opening to outside the first space, or the forward end retreats from the first opening into the first space by less than 3 mm. A first distance, which is a shortest distance between an outer surface of the first electrode and the first partial region, is 1 mm or greater.

21 Claims, 21 Drawing Sheets

LIQUID TREATMENT DEVICE UTILIZING PLASMA

BACKGROUND

1. Technical Field

The present disclosure relates to a liquid treatment device for performing treatments of liquids by utilizing plasma.

2. Description of the Related Art

A technology for purifying or sterilizing liquids by utilizing plasma is known. For example, Japanese Unexamined Patent Application Publication Nos. 2015-33694 and 2015-136644 disclose a liquid treatment device that supplies a gas into a liquid and generates plasma in the supplied gas.

SUMMARY

The present inventor has found an issue concerning the precipitation of silicon oxides that has not been considered in a known liquid treatment device.

One non-limiting and exemplary embodiment provides a liquid treatment device which is able to generate plasma more stably by reducing the precipitation of silicon oxides.

A liquid treatment device according to an embodiment of the present disclosure comprises: a first insulator having a tubular shape and including a first opening and a first inner surface, a gas being emitted into a subject liquid through the first opening; a first electrode that is at least partially disposed within a first space surrounded by the first inner surface; a second electrode that is at least partially disposed within the subject liquid; a gas supply source that emits the gas into the subject liquid via the first opening by supplying the gas into the first space; and a power supply source that generates plasma by applying a voltage between the first and second electrodes. The first inner surface includes a first partial region which contacts the first opening. A forward end of the first electrode protrudes from the first opening to outside the first space, or the forward end retreats from the first opening into the first space by less than 3 mm. A first distance, which is a shortest distance between an outer surface of the first electrode and the first partial region, is 1 mm or greater.

According to an embodiment of the disclosure, it is possible to provide a liquid treatment device which is able to generate plasma more stably by reducing the precipitation of silicon oxides.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Underlying Knowledge Forming Basis of Aspect of the Present Disclosure

The present inventor has found that, in performing treatments of tap water by using a known liquid treatment device, about three minutes after discharge has started, the discharge becomes unstable, and has also visually checked that precipitates adhere to portions near an opening of an insulator about five minutes after the discharge has started.

Figure 1:
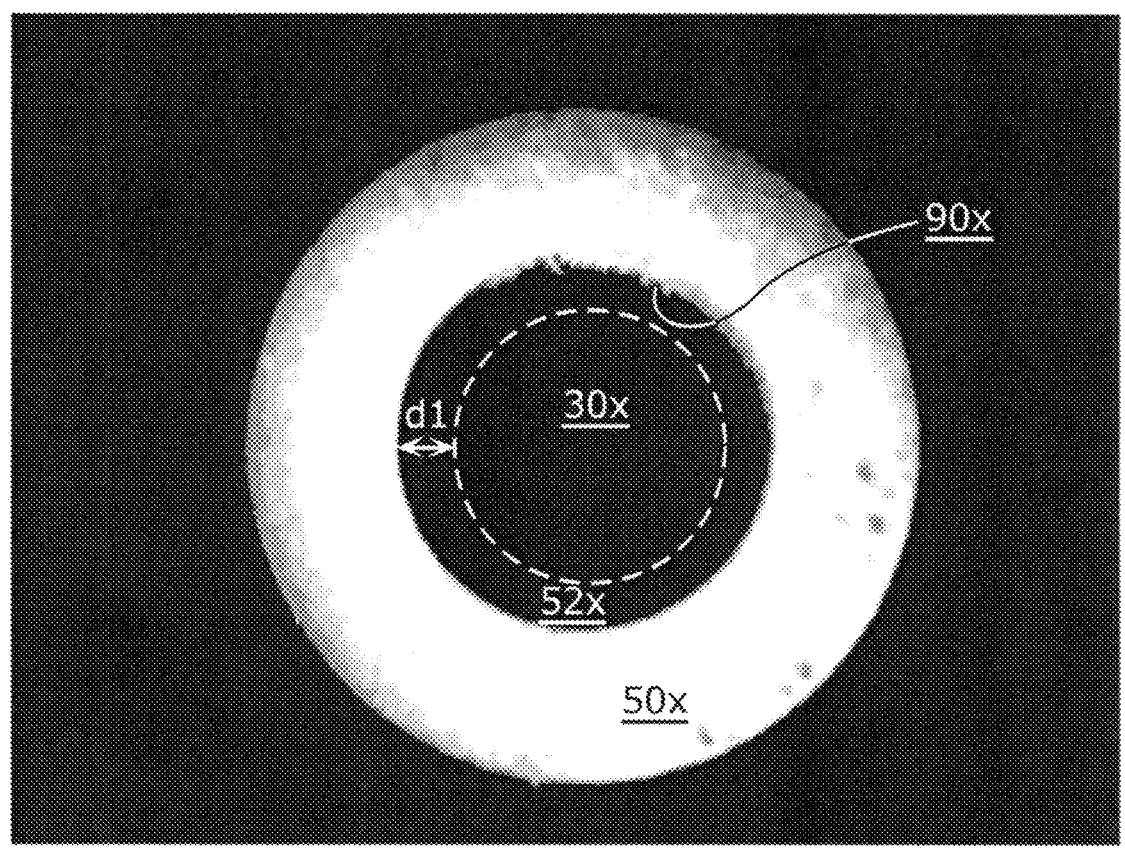
FIG. 1 illustrates the results of observing precipitates adhering to an insulator as viewed from an opening of the insulator.
Figure 6:
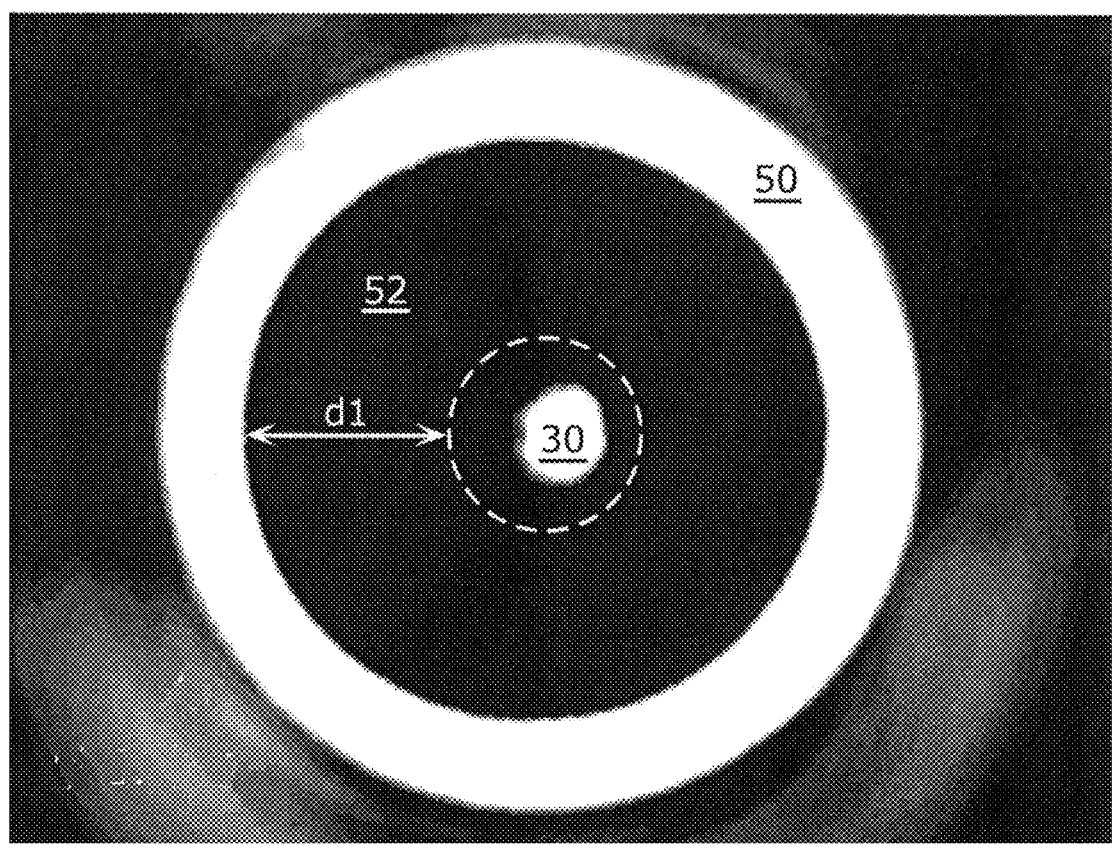
FIG. 6 illustrates the results of observing the first electrode and an insulator as viewed from an opening of the insulator in the first embodiment.
Figure 8:
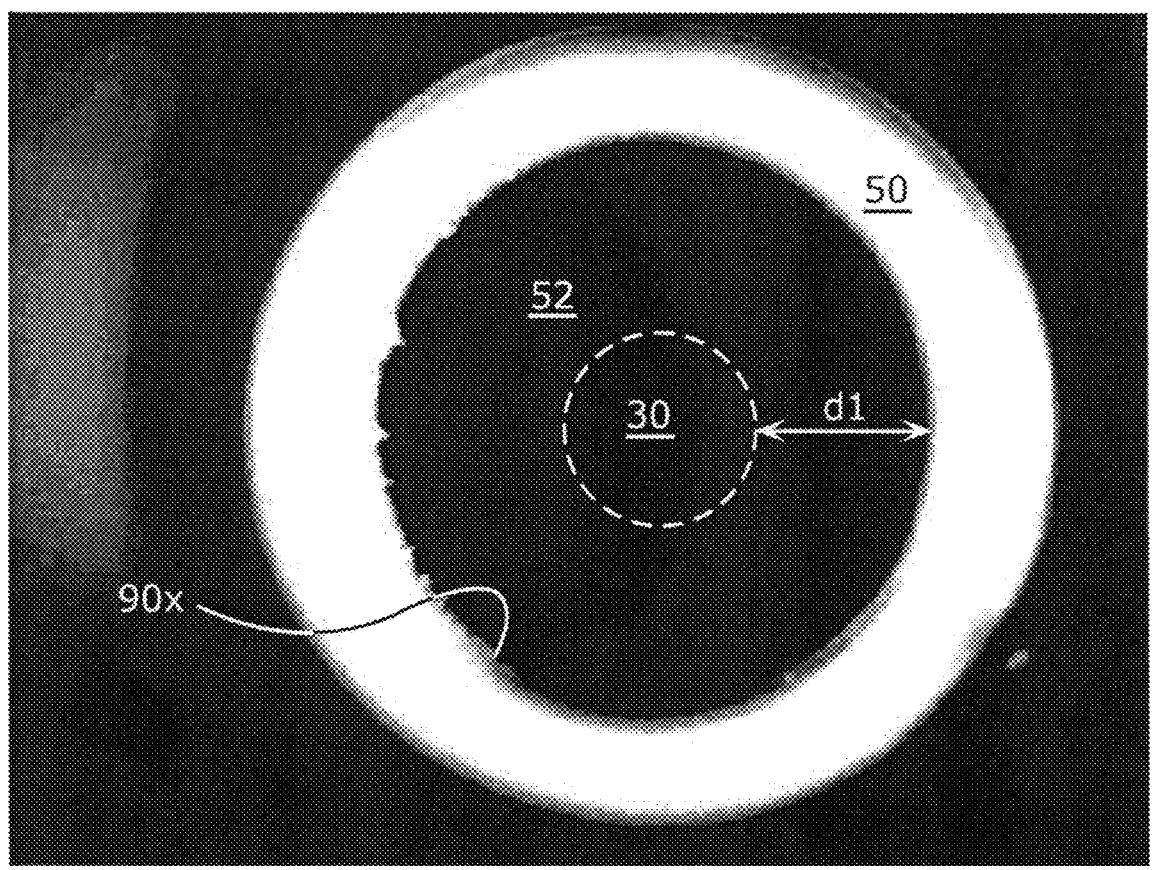
FIG. 8 illustrates the results of observing the first electrode and the insulator as viewed from the opening of the insulator when the distance is 1.1 mm and the amount of retreat is 4 mm as shown in FIG. 7.

FIG. 1 illustrates the results of observing precipitates 90x adhering to an insulator 50x as viewed from the opening of the insulator 50x. In FIG. 1, a substantially ring-like shape in white or gray having a predetermined width represents the schematic configuration of the insulator 50x. A first electrode 30x is located farther backward than the opening of the insulator 50x and has not been captured within the image shown in FIG. 1. The schematic configuration of the first electrode 30x that would be viewed from the opening of the insulator 50x is represented by a circle indicated by the white dashed line. FIGS. 6 and 8 are also illustrated in a similar manner.

The inner diameter of the insulator 50x is 1 mm, and the outer diameter of the first electrode 30x is 0.8 mm. The distance between the outer surface of the first electrode 30x and the inner surface of the insulator 50x, that is, a width d1 of a space 52x is 0.1 mm. FIG. 1 shows that the precipitates 90x adhere to the inner surface of the insulator 50x near the opening.

Figure 2:
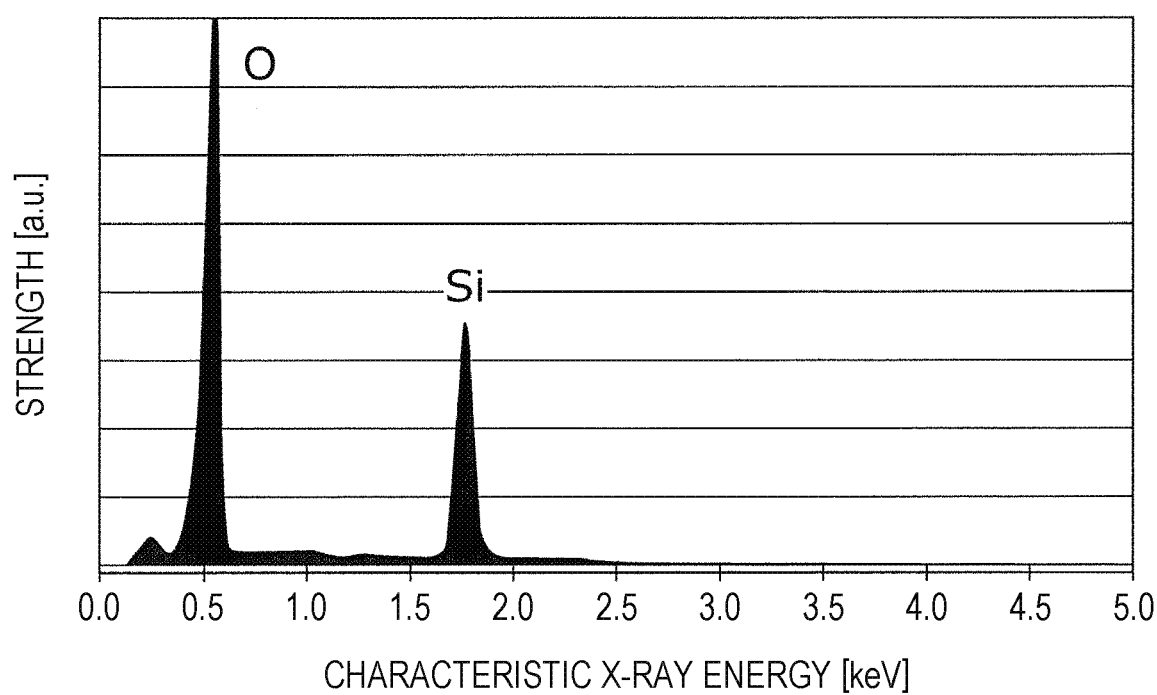
FIG. 2 is a graph illustrating the results of analyzing the precipitates adhering to the insulator shown in FIG. 1.

FIG. 2 is a graph illustrating the results of analyzing the precipitates 90x adhering to the insulator 50x shown in FIG. 1. More specifically, FIG. 2 shows the results of analyzing the precipitates 90x by scanning electron microscope (SEM) energy dispersive X-ray (EDX) spectroscopy. In FIG. 2, the horizontal axis indicates characteristic X-ray energy, and the vertical axis indicates the strength (count value) thereof.

FIG. 2 shows that the precipitates 90x are silicon oxide ($SiO_x$) compounds. The present inventor has considered the reasons why the precipitates 90x adhere to the inner surface of the insulator 50x.

The width d1 of the space 52x between the first electrode 30x and the insulator 50x in FIG. 1 is about 0.1 mm. That is, the close proximity between the first electrode 30x and the insulator 50x causes dielectric barrier discharge or creeping discharge therebetween. The surface of the insulator 50x is exposed to plasma generated by such a discharge, and then, silica contained in tap water may probably precipitate on the inner surface of the insulator 50x. That is, the precipitates 90x may be a substance formed by precipitating silica contained in tap water.

The formation of the precipitates 90x near the opening of the insulator 50x may cause a discharge between the precipitates 90x and the first electrode 30x. This may change the voltage used for generating a discharge between the first electrode 30x and a second electrode (not shown). As a result, the generation of plasma may become unstable.

To address the above-described issue, according to an aspect of the present disclosure, there is provided a liquid treatment device including first and second electrodes, a tubular first insulator, a gas supply source, and a power supply source. The first and second electrodes are at least partially disposed within a subject liquid. The tubular first insulator is disposed to surround an outer surface of the first electrode via a space and has an opening on an end surface which contacts the subject liquid. The gas supply source emits a gas into the subject liquid via the opening by supplying the gas into the first insulator. The power supply source generates plasma by applying a voltage to between the first and second electrodes. A first distance, which is a distance between the outer surface of the first electrode and an inner surface of the first insulator, is 1 mm or greater.

The first electrode and the first insulator are sufficiently separated from each other since the distance therebetween is 1 mm or greater. Thus, dielectric barrier discharge or creeping discharge is less likely to be generated between the first electrode and the first insulator, and plasma is less likely to be generated therebetween accordingly. Hence, the possibility that the surface of the first insulator will be exposed to plasma is small, thereby reducing the formation of precipitates such as silica on the inner surface of the first insulator.

The first distance may be 1 to 3 mm.

The outer surface of the first electrode and the inner surface of the first insulator are not excessively separated from each other since the distance therebetween is 3 mm or smaller. This makes it easier for the supplied gas to cover the first electrode. As a result, in the liquid treatment device, the discharge is more stabilized, and the stable generation of plasma is achieved.

An end surface of the first electrode may retreat or protrude from the opening of the first insulator by 0 to 3 mm.

With this configuration, a discharge is more likely to be generated between the end surface of the first electrode and a gas-liquid interface, and the generation of a discharge between the first electrode and the first insulator is reduced. Precipitates such as silica are less likely to be formed. As a result, in the liquid treatment device, the discharge is more stabilized, and the stable generation of plasma is achieved.

The flow rate of a gas to be supplied can control the volume of discharge generated between the first electrode and the gas-liquid interface.

The flow rate of the gas supplied from the gas supply source may be 0.5 L/min or greater.

As the flow rate of the gas is greater, a discharge less spreads toward the inner surface of the first insulator. Thus, the surface of the first insulator is less likely to be exposed to plasma, and the formation of precipitates such as silica is reduced. As a result, in the liquid treatment device, the discharge is more stabilized, and the stable generation of plasma is achieved.

The first electrode may include an elongated cylindrical electrode portion. The first insulator may be an elongated circular tubular member which surrounds the outer surface of the electrode portion. The electrode portion and the first insulator may be coaxially disposed.

With this configuration, a space having a uniform width is formed between the electrode portion and the first insulator, and the surface of the first insulator is less likely to be exposed to plasma. The volume of the gas flowing through the space can be made uniform. As a result, in the liquid treatment device, the stable generation of plasma is achieved.

If, while a gas is traveling within a predetermined flow channel, the width of the flow channel of the gas is changed, the flow velocity of the gas also varies locally, which may cause the occurrence of a swirl. If a swirl is generated within the first insulator, the subject liquid may be drawn into the first insulator through its opening.

In the liquid treatment device of this aspect of the disclosure, the first electrode may include an elongated cylindrical electrode portion and a cylindrical support portion. The support portion is disposed at the rear side of the electrode portion and supports the electrode portion. The support portion is thicker than the electrode portion. The support portion may include a gas supply hole which allows the gas supplied from the gas supply source to pass therethrough. An opening width of the gas supply hole and an inner diameter of the first insulator may be substantially the same.

The gas supplied from the gas supply source enters the first insulator via the gas supply hole, and the width of the flow channel of the gas can be made substantially uniform in a range between the gas supply hole and the first insulator. This reduces the possibility that a swirl will occur within the first insulator, thereby making it possible to generate plasma more stably.

The liquid treatment device may further include an inlet disposed on the rear side of the first insulator. The inlet is used for guiding the gas supplied from the gas supply source into the first insulator. A flowing direction of the gas passing through the inlet may intersect with an axial direction of the first insulator.

The gas entering through the inlet travels in a direction intersecting with the axial direction of the first insulator and strikes the inner surface of the first insulator, and then travels within the first insulator in the axial direction thereof. In this manner, since the traveling direction of the gas is changed on the inner surface of the first insulator, for example, the gas can flow in the axial direction at a stable velocity near the opening of the first insulator. This can reduce the possibility that a swirl of the gas will occur within the first insulator, thereby making it possible to generate plasma more stably.

The liquid treatment device may further include a tubular member with a closed bottom. An opening width of the tubular member is substantially the same as that of the first insulator. The tubular member may be connected to the rear side of the first insulator such that the tubular member and the first insulator are coaxially positioned. The inlet may be provided at a side wall of the tubular member. A flowing direction of the gas passing through the inlet may be substantially perpendicular to the axial direction of the first insulator.

The gas entering through the inlet travels in a direction intersecting with the axial direction of the tubular member and strikes the inner surface of the tubular member, for example, and then travels within the first insulator in the axial direction thereof. In this manner, since the traveling direction of the gas is changed on the side wall, for example, the gas can flow at a stable velocity within the first insulator in the axial direction thereof. This can reduce the possibility that a swirl of the gas will occur within the first insulator, thereby making it possible to generate plasma more stably.

When a voltage is applied to the first electrode surrounded by the tubular first insulator via a space, the Maxwell stress tensor is applied to a gas-liquid interface (interface between the gas and a subject liquid) near the opening of the first insulator in accordance with the strength of the electric field generated in the gas-liquid interface. Because of this Maxwell stress tensor, the liquid may penetrate into the first insulator via the inner surface of the first insulator through the opening.

The liquid treatment device of this aspect of the disclosure may further include a tubular second insulator disposed to surround the outer surface of the first electrode via a space. The second insulator may be connected to the rear side of the first insulator such that the inside of the second insulator communicates with the inside of the first insulator. A second distance, which is a distance between the outer surface of the first electrode and the inner surface of the second insulator, may be greater than the first distance.

With this configuration, the electric field generated between the inner surface of the second insulator and the first electrode becomes smaller than that between the inner surface of the first insulator and the first electrode. The subject liquid penetrated into the first insulator is less likely to enter the second insulator. As a result, in the liquid treatment device, the stable generation of plasma is achieved.

The second distance may be determined by a value of the voltage applied by the power supply source. The second distance may be a distance which allows an electric field of a predetermined value or lower to be generated on the inner surface of the second insulator by the voltage applied by the power supply source.

Then, it is possible to form the second insulator with a suitable size in accordance with the voltage applied between the first and second electrodes. That is, the size of the second insulator is not larger than necessary, thereby implementing a smaller, lighter, less expensive liquid treatment device.

The voltage applied to between the first and second electrodes may be 5 kV or lower, and the second distance may be 2.6 mm or greater.

When the applied voltage is 5 kV or lower, the possibility that the subject liquid will enter the second insulator can be reduced.

The voltage applied to between the first and second electrodes may be 5 kV or higher, and the second distance may be 5 mm or greater.

When the applied voltage is 5 kV or higher, the possibility that the subject liquid will enter the second insulator can be reduced.

The first electrode may include an elongated cylindrical electrode portion. The first insulator may be a circular tubular member which surrounds an outer surface of a forward side of the electrode portion. The second insulator may be a tubular member which surrounds an outer surface of a rear side of the electrode portion. The electrode portion and the first and second insulators may be coaxially disposed.

The second insulator may be a circular tubular member or a square tubular member.

With this configuration, a space having a uniform width is formed between the electrode portion and the first insulator and between the electrode portion and the second insulator, thereby making the strength of the electric field generated therebetween be uniform. It is unlikely that the electric field in a certain portion is stronger than that in the other portions between the electrode portion and each of the first and second insulators, thereby reducing the possibility that the subject liquid will enter the second insulator. As a result, in the liquid treatment device, the stable generation of plasma is achieved.

A material for the first insulator may be different from a material for the second insulator.

This enhances the workability of each of the first and second insulators and can thus precisely form each of the first and second insulators, thereby improving the reliability of the liquid treatment device.

The first and second insulators may be formed integrally together by using the same material.

With this configuration, since fewer components are required, the weight of the liquid treatment device can be reduced. In a manufacturing method for the liquid treatment device, fewer steps are required for assembling the components, thereby reducing the cost.

According to another aspect of the present disclosure, there is provided a liquid treatment device including a first insulator, first and second electrodes, a gas supply source, and a power supply source. The first insulator has a tubular shape and includes a first opening and a first inner surface. A gas is emitted into a subject liquid through the first opening. The first electrode is at least partially disposed within a first space surrounded by the first inner surface. The second electrode is at least partially disposed within the subject liquid. The gas supply source emits the gas into the subject liquid via the first opening by supplying the gas into the first space. The power supply source generates plasma by applying a voltage to between the first and second electrodes. The first inner surface includes a first partial region which contacts the first opening. A forward end of the first electrode protrudes from the first opening to outside the first space, or the forward end retreats from the first opening into the first space by less than 3 mm. A first distance, which is a shortest distance between an outer surface of the first electrode and the first partial region, is 1 mm or greater.

The shortest distance between the outer surface of the first electrode and the first partial region is 1 mm or greater. Thus, dielectric barrier discharge or creeping discharge is less likely to be generated between the first electrode and the first insulator, and plasma is less likely to be generated therebetween accordingly. Hence, the possibility that the surface of the first insulator will be exposed to plasma is small, thereby reducing the formation of precipitates such as silica on the inner surface of the first insulator.

In this specification, a "tubular" shape may be a "circular tubular", "polygonal tubular", or "funnel-like" shape. The tubular shape may be rotationally symmetrical or may not be rotationally symmetrical. The outer shape of the first insulator may be the same as the shape of the first space, or may be different from each other. For example, the outer shape of the first insulator may be cylindrical, while the outer shape of the first space may be a polygonal prism, and vice versa. The shape of the first electrode may be a cylinder, a polygonal prism, or a pyramid. When the shape of the first electrode, the outer shape of the first insulator, and the shape of the first space have central axes in the longitudinal direction, these central axes may coincide with each other, or may not coincide with each other.

The first opening may face downward and supply a gas downward. The first opening may face upward and supply a gas upward. The first opening may face in another direction and supply a gas in this direction.

The first partial region may be a ring-like region on the first inner surface within a predetermined distance (for example, 4 mm) from the first opening.

The forward end of the first electrode may protrude from the first opening to outside the first space.

In the related art, by using dielectric barrier discharge or creeping discharge as an auxiliary discharge, the voltage at which glow discharge starts is reduced. In this aspect of the disclosure, dielectric barrier discharge or creeping discharge is less likely to be generated. However, the forward end of the first electrode protrudes to the outside, and thus, glow discharge can start even with no discharge or a weak auxiliary discharge.

The forward end of the first electrode may protrude from the first opening to outside the first space by 1 mm or greater.

The forward end of the first electrode may protrude from the first opening to outside the first space by 3 mm or smaller.

This configuration makes it possible to more reliably cover the entirety of the electrode portion protruding from the first opening with the gas, thereby generating plasma more stably.

The first inner surface may include a second partial region which surrounds the first electrode. The second partial region is different from the first partial region. The first distance or a shortest distance between the outer surface of the first electrode and the second partial region may be a distance which allows an electric field of $1.6 \times 10^6$ V/m or lower to be generated in the first or second partial region by the voltage applied by the power supply source.

The first distance or a shortest distance between the outer surface of the first electrode and the second partial region may be 2.6 mm or greater.

The first distance or the shortest distance between the outer surface of the first electrode and the second partial region may be 5 mm or greater.

The first distance may be 10 mm or smaller, which makes it possible to generate bubbles more suitably.

A flow rate of the gas supplied from the gas supply source may be 0.5 L/min or greater.

The first electrode may include an elongated cylindrical electrode portion. The first insulator may be an elongated circular tubular member which surrounds the outer surface of the electrode portion. The electrode portion and the first insulator may be coaxially disposed.

The first electrode may include an elongated cylindrical electrode portion and a cylindrical support portion. The electrode portion has a forward end on a downstream side in a flowing direction of the gas and a rear end on an upstream side in the flowing direction of the gas. The support portion is disposed on a side of the rear end of the electrode portion and supports the electrode portion. The support portion may be thicker than the electrode portion. The first insulator may be a circular tubular member. The support portion may include a gas supply hole which allows the gas supplied from the gas supply source to pass through the gas supply hole. An opening width of the gas supply hole and an inner diameter of the first insulator may be substantially the same.

The liquid treatment device may further include a pipe. The pipe includes an inlet for guiding the gas supplied from the gas supply source into the first space. A flowing direction of the gas passing through the inlet may intersect with an axial direction of the first insulator.

The liquid treatment device may further include a tubular member. The tubular member has a third opening and a closed end on a side opposite the third opening. The first insulator may have a second opening on a side opposite the first opening. A width of the third opening may be substantially the same as a width of the second opening, and the third opening and the second opening may be connected to each other such that the tubular member and the first insulator are coaxially disposed. The inlet may be provided at a side wall of the tubular member.

The liquid treatment device may further include a second insulator. The second insulator has a tubular shape and includes a second inner surface which surrounds the outer surface of the first electrode via a second space. The first insulator may have a second opening on a side opposite the first opening. The second insulator may be connected to the second opening of the first insulator such that the second space and the first space communicate with each other. A second distance, which is a shortest distance between the outer surface of the first electrode and the second inner surface, may be greater than the first distance.

The outer shape of the second insulator may be the same as the shape of the second space, or may be different from each other. For example, the outer shape of the second insulator may be cylindrical, while the shape of the second space may be a polygonal prism, and vice versa. When the shape of the first electrode, the outer shape of the second insulator, and the shape of the second space have central axes in the longitudinal direction, these central axes may coincide with each other, or may not coincide with each other.

The second distance may be a distance which allows an electric field of $1.6 \times 10^6$ V/m or lower to be generated on the second inner surface by the voltage applied by the power supply source.

The voltage applied to between the first and second electrodes may be 5 kV or lower, and the second distance may be 2.6 mm or greater.

The voltage applied to between the first and second electrodes may be 5 kV or higher, and the second distance may be 5 mm or greater.

The first electrode may include an elongated cylindrical electrode portion. The electrode portion has a forward end on a downstream side in a flowing direction of the gas and a rear end on an upstream side in the flowing direction of the gas. The first insulator may be a circular tubular member which surrounds an outer surface on a side of the forward end of the electrode portion. The second insulator may be a tubular member which surrounds an outer surface on a side of the rear end of the electrode portion. The electrode portion and the first and second insulators may be coaxially disposed.

The second insulator may be a circular tubular member or a square tubular member.

A material for the first insulator may be different from a material for the second insulator.

A material for the first insulator may be the same as a material for the second insulator, and the first insulator may be formed integrally with the second insulator.

Embodiments of the present disclosure will be described below in detail with reference to the accompanying drawings.

All of the embodiments described below illustrate general or specific examples. Numeric values, configurations, materials, components, positions and connection states of the components, steps, and the order of steps illustrated in the following embodiments are only examples, and are not described for limiting the present disclosure. Among the components illustrated in the following embodiments, the components that are not recited in the independent claims which embody the broadest concept of the present disclosure will be described as optional components.

In the drawings, the components are only schematically illustrated and are not necessarily illustrated precisely. The sizes and dimensional ratios of the components in the drawings are not necessarily illustrated as actual sizes and ratios. The substantially same components are designated by the same reference numerals, and an explanation thereof will be given only once or simplified from the second time.

First Embodiment 1-1. Overview

Figure 3:
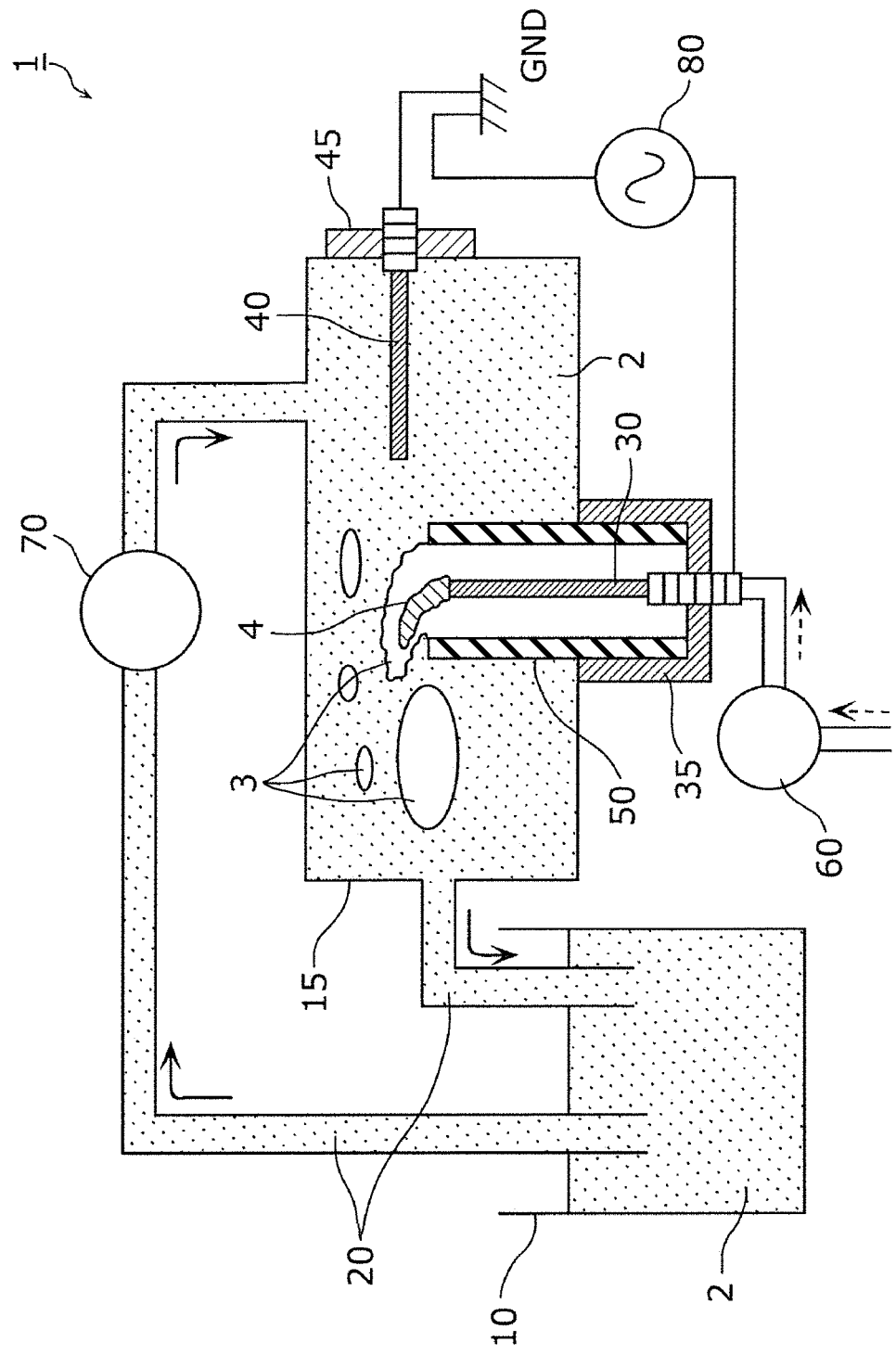
FIG. 3 is a schematic view illustrating the configuration of a liquid treatment device according to a first embodiment.

An overview of a liquid treatment device 1 according to a first embodiment will be described below with reference FIG. 3 illustrating the configuration of the liquid treatment device 1.

As shown in FIG. 3, the liquid treatment device 1 generates plasma 4 within a gas 3 emitted into a liquid 2. The gas 3 emitted into the liquid 2 remains in the liquid 2 as bubbles. The gas-liquid interface of the bubbles formed by the gas 3 may be closed within the liquid 2 or may communicate with the outer space.

The liquid 2 is a subject on which treatments are made by the liquid treatment device 1. The liquid 2 is, for example, water such as tap water or purified water, or an aqueous solution. As a result of generating the plasma 4 within the liquid 2, the liquid treatment device 1 generates active species within the liquid 2. Examples of the active species are hydroxyl radical (OH), hydrogen radical (H), oxygen radical (O), superoxide anion ($O_2^-$), monovalent oxygen ion ($O^-$), and hydrogen peroxide ($H_2O_2$).

The generated active species decompose substances contained in the liquid 2, so that the liquid treatment device 1 can sterilize the liquid 2. The liquid treatment device 1 may also sterilize another liquid or a gas by using the liquid 2 including active species (that is, the liquid 2 subjected to plasma treatment). The plasma-treated liquid 2 may be used for various purposes including sterilizing.

1-2. Configuration

The configuration of the liquid treatment device 1 according to the first embodiment will be discussed below.

As shown in FIG. 3, the liquid treatment device 1 includes a treatment tank 10, a reaction tank 15, piping 20, a first electrode 30, a first holding portion 35, a second electrode 40, a second holding portion 45, an insulator 50, a gas supply pump 60, a liquid supply pump 70, and a power supply source 80. The individual elements forming the liquid treatment device 1 will be discussed below in detail.

1-2-1. Treatment Tank

The treatment tank 10 is a container for storing the liquid 2. The outer configuration of the treatment tank 10 is any shape such as a rectangular parallelepiped, a cylinder, and a sphere. The treatment tank 10 may be a reservoir tank having an opening or a tray with its top opened.

The piping 20 is connected to the treatment tank 10. More specifically, the treatment tank 10 is connected to the reaction tank 15 via the piping 20. The liquid supply pump 70 is connected to the piping 20, and the liquid 2 circulates between the treatment tank 10 and the reaction tank 15 via the piping 20.

The treatment tank 10 is made of an acid-resistant resin material, for example, fluoropolymers such as polytetrafluoroethylene, silicone rubber, polyvinyl chloride, stainless steel, or ceramic.

1-2-2. Reaction Tank

The reaction tank 15 is a tank within which the first and second electrodes 30 and 40 are disposed. More specifically, the first and second electrodes 30 and 40 pass through side walls of the reaction tank 15. The reaction tank 15 is filled with the liquid 2. Within the reaction tank 15, the plasma 4 is generated in the gas (bubbles) 3 supplied from the gas supply pump 60 as a result of generating a discharge between the first and second electrodes 30 and 40.

The outer configuration of the reaction tank 15 is any shape such as a rectangular parallelepiped, a cylinder, and a sphere. The reaction tank 15 may be a reservoir tank having an opening or a tray with its top opened. The reaction tank 15 may be part of the piping 20.

The reaction tank 15 is made of an acid-resistant resin material, for example, fluoropolymers such as polytetrafluoroethylene, silicone rubber, polyvinyl chloride, stainless steel, or ceramic.

1-2-3. Piping

The piping 20 is used for forming a flow channel for the liquid 2, and is constituted by a hollow member such as a pipe, a tube, or a hose. The piping 20 is made of an acid-resistant resin material, for example, fluoropolymers such as polytetrafluoroethylene, silicone rubber, polyvinyl chloride, stainless steel, or ceramic.

In the first embodiment, the piping 20 connects the treatment tank 10 and the liquid supply pump 70, connects the liquid supply pump 70 and the reaction tank 15, and connects the reaction tank 15 and the treatment tank 10. In this manner, the piping 20 connects the treatment tank 10, the liquid supply pump 70, the reaction tank 15, and the treatment tank 10 in this order so as to form a circulation path for the liquid 2. In FIG. 3, the solid arrows drawn along the piping 20 indicate the direction in which the liquid 2 flows (that is, the circulating direction).

1-2-4. First Electrode

Figure 4A:
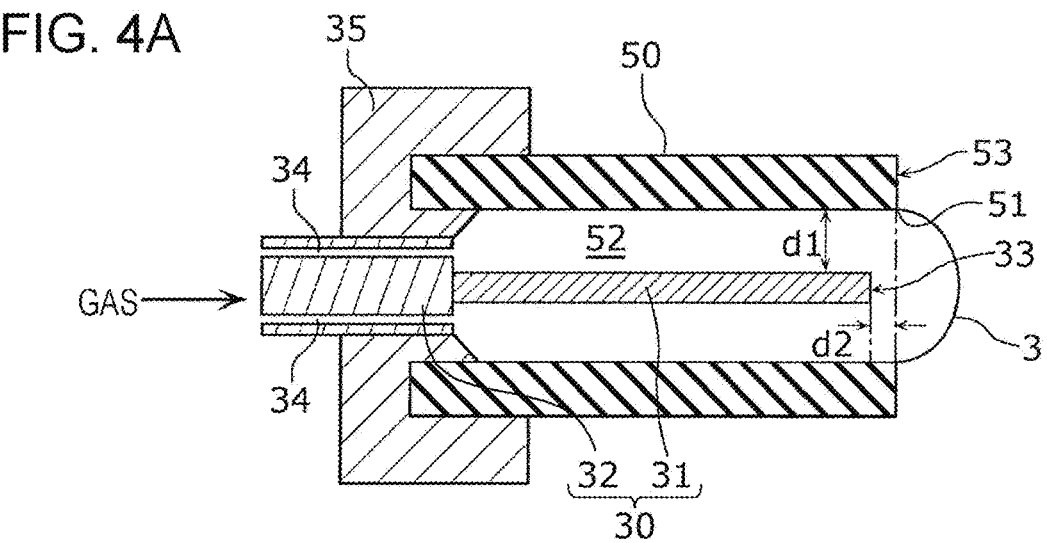
FIG. 4A is a sectional view illustrating an example of a first electrode in the first embodiment.

FIG. 4A is a sectional view illustrating an example of the first electrode 30 in the first embodiment. More specifically, FIG. 4A illustrates a cross section passing through the longitudinal axis of the first electrode 30. As shown in FIG. 4A, the first electrode 30 includes an electrode portion 31 and a screw portion 32.

The first electrode 30 is one of a pair of electrodes for generating the plasma 4. The first electrode 30 is used as a reaction electrode around which the plasma 4 is generated.

The electrode portion 31 is an elongated cylindrical electrode portion provided on the forward side of the first electrode 30. The diameter of the electrode portion 31 is the one which is sufficient to generate the plasma 4, for example, 2 mm or smaller. In this example, the diameter of the electrode portion 31 is 0.8 mm.

The electrode portion 31 is made of tungsten, for example, but is not restricted thereto. The electrode portion 31 may be made of another metal such as aluminum, iron, or copper, or an alloy thereof.

At least part of the first electrode 30 is disposed within a space 52. More specifically, at least part of the electrode portion 31 of the first electrode 30 is disposed within the reaction tank 15. As shown in FIG. 4A, the electrode portion 31 is surrounded by the insulator 50 via the space 52. When the gas 3 is not supplied to the reaction tank 15 by the gas supply pump 60, the liquid 2 fills the space 52. At least part of the first electrode 30 is disposed within the liquid 2 and thus contacts the liquid 2. When the gas 3 is supplied to the reaction tank 15 by the gas supply pump 60, the gas 3 fills the space 52, and thus, the electrode portion 31 is surrounded by the gas 3 and does not contact the liquid 2.

In the first embodiment, the electrode portion 31 and the insulator 50 are coaxially disposed. The space 52 is formed between the electrode portion 31 and the insulator 50, along the entire circumference of the electrode portion 31. That is, the space 52 is a circular tubular space having a substantially uniform width d1. The width d1 is a first distance, which is a distance between the outer surface of the first electrode 30 and the inner surface of the insulator 50. The width d1 is 1 mm or greater. The width d1 may be 1 to 3 mm, for example.

The screw portion 32 is a metallic member supporting the electrode portion 31. More specifically, the electrode portion 31 is pressed into the screw portion 32 and is fixed. The screw portion 32 is electrically connected to the electrode portion 31 and transmits power received from the power supply source 80 to the electrode portion 31.

The screw portion 32 is a cylindrical support portion disposed on the rear side of the first electrode 30. The diameter of the screw portion 32 is greater than that of the electrode portion 31, and is 3 mm, for example. The screw portion 32 is made of a metal which is easy to work, such as stainless steel or iron.

The screw portion 32 is supported by the first holding portion 35. More specifically, a male thread is formed on the outer surface of the screw portion 32 and is screwed with a female thread formed on the first holding portion 35, thereby holding the screw portion 32 by the first holding portion 35.

Through-holes 34 connected to the gas supply pump 60 are provided in the screw portion 32. The through-holes 34 communicate with the space 52. Thus, the gas 3 supplied from the gas supply pump 60 is emitted into the liquid 2 stored in the reaction tank 15 from the opening 51 of the insulator 50 via the through-holes 34 and the space 52.

In the first embodiment, the two through-holes 34 are provided in the screw portion 32, as shown in FIG. 4A. This reduces the pressure drop of the gas 3 in the through-holes 34. However, one through-hole 34 or three or more through-holes 34 may be provided.

As shown in FIG. 4A, an end surface 33 of the first electrode 30 retreats from the opening 51. An amount of retreat d2 is defined by a range within which the contact between the plasma 4 generated near the end surface 33 and the inner surface of the insulator 50 can be reduced. More specifically, the amount of retreat d2 of the end surface 33 of the first electrode 30 is 0 to 3 mm.

The amount of retreat d2 is adjustable by axially rotating the screw portion 32. Rotating of the screw portion 32 axially shifts the electrode portion 31 and the screw portion 32 together with respect to the insulator 50 held by the first holding portion 35. This makes it possible to vary the position of the end surface 33. For example, as shown in FIG. 4B, the end surface 33 of the first electrode 30 may protrude from the opening 51.

Figure 4B:
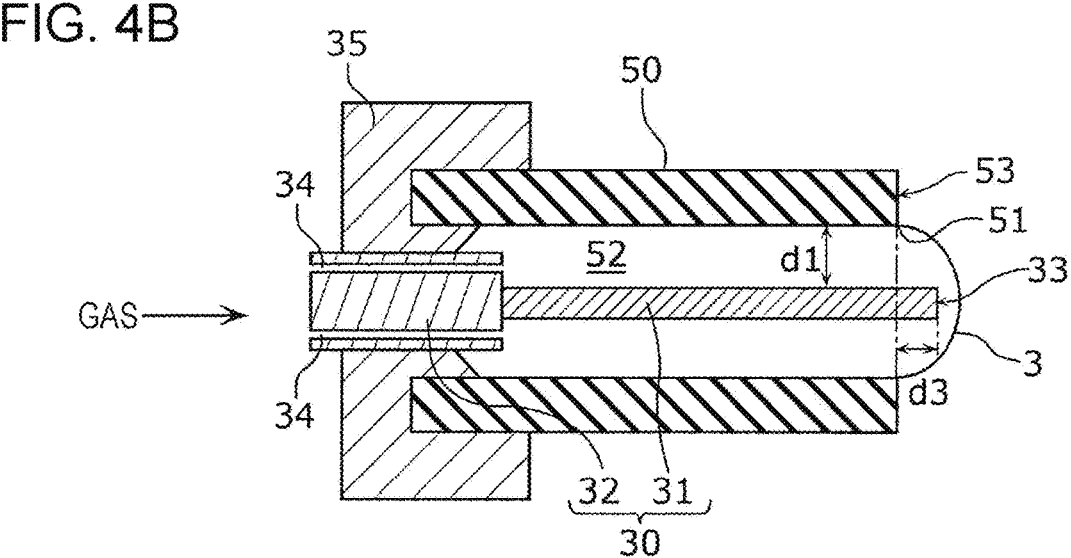
FIG. 4B is a sectional view illustrating another example of the first electrode in the first embodiment.

FIG. 4B is a sectional view illustrating another example of the first electrode 30 in the first embodiment. An amount of protrusion d3 is defined by a range within which the end surface 33 can be contained within the gas 3 supplied from the gas supply pump 60. More specifically, the amount of protrusion d3 of the end surface 33 of the first electrode 30 is 0 to 3 mm.

1-2-5. First Holding Portion

The first holding portion 35 is a member for holding the first electrode 30. In the first embodiment, the first holding portion 35 holds the first electrode 30 and the insulator 50 and fixes them to certain positions of the reaction tank 15.

The female thread is formed on the first holding portion 35 and is screwed with the male thread formed on the screw portion 32 of the first electrode 30. Rotating of the screw portion 32 axially can adjust the axial position of the first electrode 30 with respect to the first holding portion 35. The insulator 50 is fixed to the first holding portion 35 or the reaction tank 15, and the position of the end surface 33 of the first electrode 30 with respect to the opening 51 of the insulator 50 can be adjusted. That is, the amount of retreat d2 or the amount of protrusion d3 of the end surface 33 can be adjusted.

1-2-6. Second Electrode

Figure 5:
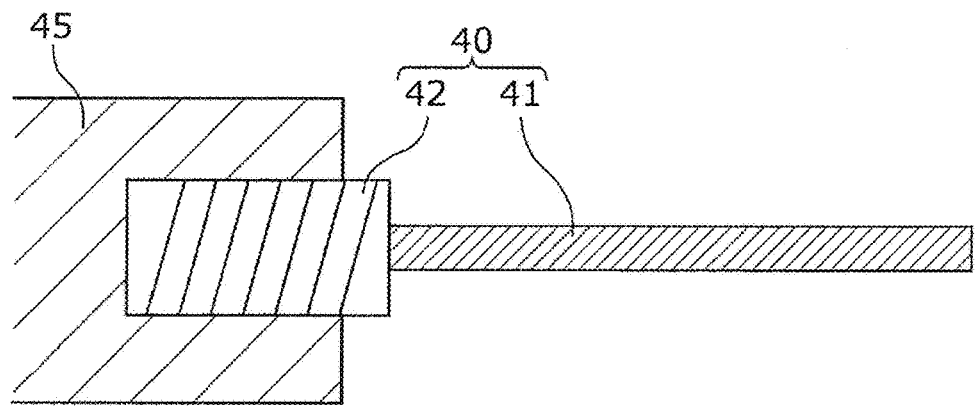
FIG. 5 is a sectional view illustrating an example of a second electrode in the first embodiment.

FIG. 5 is a sectional view illustrating an example of the second electrode 40 in the first embodiment. More specifically, FIG. 5 illustrates a cross section passing through the longitudinal axis of the second electrode 40. As shown in FIG. 5, the second electrode 40 includes an electrode portion 41 and a screw portion 42.

The second electrode 40 is the other one of the pair of electrodes for generating the plasma 4. At least part of the second electrode 40 is disposed within the liquid 2. More specifically, the electrode portion 41 of the second electrode 40 is disposed within the reaction tank 15 and contacts the liquid 2.

The electrode portion 41 is an elongated cylindrical electrode portion provided on the forward side of the second electrode 40. The size and the material of the electrode portion 41 are the same as those of the electrode portion 31 of the first electrode 30. However, they may be different from each other.

The screw portion 42 is a metallic member supporting the electrode portion 41. More specifically, the electrode portion 41 is pressed into the screw portion 42 and is fixed. The screw portion 42 is electrically connected to the electrode portion 41 and transmits power received from the power supply source 80 to the electrode portion 41.

The screw portion 42 is a cylindrical support portion disposed on the rear side of the second electrode portion 40. The diameter of the screw portion 42 is greater than that of the electrode portion 41, and is 3 mm, for example. The screw portion 42 is made of a metal which is easy to work, such as stainless steel or iron.

The screw portion 42 is supported by the second holding portion 45. More specifically, a male thread is formed on the outer surface of the screw portion 42 and is screwed with a female thread formed on the second holding portion 45, so that the screw portion 42 can be held by the second holding portion 45.

1-2-7. Second Holding Portion

The second holding portion 45 is a member for holding the second electrode 40. In the first embodiment, the second holding portion 45 holds the second electrode 40 and fixes it to a certain position of the reaction tank 15.

The female thread is formed on the second holding portion 45 and is screwed with the male thread formed on the screw portion 42 of the second electrode 40. This makes it possible to adjust the position of the electrode portion 41 positioned within the reaction tank 15.

1-2-8. Insulator (First Insulator)

The insulator 50 is an example of a first insulator disposed to surround the outer surface of the first electrode 30 via the space 52. The insulator 50 is a tubular insulator having the opening 51 formed at an end surface 53 which contacts the liquid 2. In the first embodiment, the insulator 50 is an elongated circular tubular member which surrounds the outer surface of the electrode portion 31 of the first electrode 30.

The inner diameter of the insulator 50 is greater than the outer diameter of the electrode portion 31. The electrode portion 31 and the insulator 50 are coaxially disposed. The space 52 is formed in the shape of a circular tube along the entire circumference of the electrode portion 31, and thus prevents the electrode portion 31 from contacting the insulator 50. The inner diameter of the insulator 50 is 3 mm, for example, and the outer diameter of the electrode portion 31 is 0.8 mm, for example. The width d1 of the space 52 is calculated to be 1.1 mm.

The gas 3 supplied to the space 52 is emitted into the liquid 2 within the reaction tank 15 via the opening 51. The emitted gas 3 is diffused into the liquid 2 as bubbles. In this case, the opening 51 determines the largest size of the bubbles.

The insulator 50 is made of alumina ceramic, for example. Alternatively, the insulator 50 may be made of magnesia, zirconia, quartz, or yttrium oxide.

The shape of the insulator 50 is not restricted to a circular tube. The shape of the insulator 50 may be a square tube. The insulator 50 is held by the first holding portion 35, but may be fixed to the wall surface of the reaction tank 15. The gap between the insulator 50 and the first holding portion 35 or the gap between the insulator 50 and the wall surface of the reaction tank 15 may be filled with adhesive such as epoxy adhesive. This can reduce the possibility that the liquid 2 will penetrate into the insulator 50 via the gap, which would make the discharge unstable.

1-2-9. Gas Supply Pump

The gas supply pump 60 is an example of a gas supply source that emits the gas 3 into the liquid 2 via the opening 51 by supplying the gas 3 into the insulator 50. The gas supply pump 60 is connected to the screw portion 32 of the first electrode 30, for example. The gas supply pump 60 absorbs surrounding air, for example, as the gas 30 and supplies it to the space 52 via the through-holes 34 of the screw portion 32. The gas 3 supplied from the gas supply pump 60 is not restricted to air. The gas 3 may be argon, helium, nitrogen gas, or oxygen gas.

In the first embodiment, the flow rate of the gas 3 supplied from the gas supply pump 60 is 0.5 liters per minute (L/min) or greater. The gas 3 supplied from the gas supply pump 60 pushes the liquid 2 out of the space 52 via the opening 51 and covers the electrode portion 31. The gas 3 is emitted into the liquid 2 within the reaction tank 15 via the opening 51.

1-2-10. Liquid Supply Pump

The liquid supply pump 70 is an example of a liquid supply unit that circulates the liquid 2 between the treatment tank 10 and the reaction tank 15 via the piping 20. In the first embodiment, the liquid supply pump 70 is disposed at some midpoint in the piping 20.

1-2-11. Power Supply Source

The power supply source 80 applies a voltage to between the first and second electrodes 30 and 40 so as to generate the plasma 4. More specifically, the power supply source 80 applies a pulse voltage or an alternating current (AC) voltage to between the first and second electrodes 30 and 40.

The applied voltage is a positive-polarity high voltage pulse of 2 to 50 kV/cm at a frequency of 1 Hz to 100 kHz, for example. The voltage waveform may be any one of pulse, half-sine, and sine waves. The current flowing between the first and second electrodes 30 and 40 is 1 mA to 3 A, for example. In this example, the power supply source 80 applies a positive pulse voltage having a peak voltage of 4 kV at a frequency of 30 kHz.

1-3. Operation

The operation of the liquid treatment device 1 according to the first embodiment will be described below.

In the liquid treatment device 1, while the liquid supply pump 70 is circulating the liquid 2, the gas supply pump 60 supplies the gas 3. The gas 3 is supplied to the space 52 via the through-holes 34 of the screw portion 32. The liquid 2 which has filled the space 52 is emitted into the liquid 2 within the reaction tank 15 via the opening 51. The flow rate of the gas 3 is 0.8 L/min, for example. The gas 3 fills the space 52 and thus covers the electrode portion 31 of the first electrode 30.

The power supply source 80 applies a voltage, for example, a positive pulse voltage having a peak voltage of 4 kV at a frequency of 30 kHz, to between the first and second electrodes 30 and 40. This generates a discharge within the gas 3 (bubbles) which covers the electrode portion 31 from the end surface 33 of the first electrode 30, thereby generating the plasma 4. Active species are then generated by the plasma 4 and are absorbed into the liquid 2. The liquid 2 is circulating, and thus, the active species fill the entirety of the liquid 2.

1-4. Advantages

1-4-1. Influence of Distance (Width d1) Between First Electrode and Insulator on Plasma In the liquid treatment device 1 of the first embodiment, the distance between the outer surface of the first electrode 30 and the inner surface of the insulator 50 is 1 to 3 mm, for example.

In the liquid treatment device 1, the distance between the outer surface of the first electrode 30 and the inner surface of the insulator 50 (that is, the width d1 of the space 52) is 1 mm or greater, and the first electrode 30 and the insulator 50 are sufficiently separated from each other. Thus, dielectric barrier discharge or creeping discharge is less likely to be generated between the first electrode 30 and the insulator 50, and plasma is less likely to be generated therebetween accordingly. Hence, the possibility that the surface of the insulator 50 will be exposed to plasma is small, thereby reducing the formation of precipitates on the inner surface of the insulator 50.

FIG. 6 illustrates the results of observing the first electrode 30 and the insulator 50 as viewed from the opening 51 of the insulator 50. More specifically, FIG. 6 illustrates the results of observing the opening 51 after applying a voltage to between the first and second electrodes 30 and 40 for one hour by the power supply source 80 under the condition that 500 cc of water having a silica concentration of 72 parts per million (ppm) was used as the liquid 2. In FIG. 6, the end surface 33 of the first electrode 30 is partially captured and is shown as a white portion near the center of the circle indicated by the dashed line.

In the liquid treatment device 1 of the first embodiment, no precipitates are observed on the inner surface of the insulator 50 near the opening 51, as shown in FIG. 6. Even if a very small amount of precipitates adheres to the inner surface of the insulator 50, the discharge is unlikely to become unstable since the width d1 is 1 mm or greater.

In the liquid treatment device 1, the outer surface of the first electrode 30 and the inner surface of the insulator 50 are not excessively separated from each other since the width d1 is 3 mm or smaller. This makes it easier for the gas 3 supplied to the space 52 to cover the electrode portion 31, thereby making the configuration of the gas-liquid interface more stable. As a result, the discharge can be stabilized.

As described above, in the liquid treatment device 1 according to the first embodiment, the plasma 4 can be stably generated because of a stabilized discharge.

1-4-2. Influence of Amount of Retreat d2 on Plasma

The relationship between the distance (width d1) from the outer surface of the first electrode 30 to the inner surface of the insulator 50 and the amount of retreat d2 of the end surface 33 of the first electrode 30 from the opening 51 will be discussed below.

In this example, 500 cc of water having a silica concentration of 88 ppm was used as the liquid 2 and the power supply source 80 applied a voltage to between the first and second electrodes 30 and 40 for one hour. It was then observed whether the discharge would become unstable. The flow rate of the gas 3 supplied from the gas supply pump 60 was 1.0 L/min. The inner diameter of the insulator 50 was 3 mm. Then, by varying the diameter of the electrode portion 31 and the position of the outer end 33 of the first electrode 30, the stability of discharge was observed in accordance with a combination of the width d1 and the amount of retreat d2. The results are shown in FIG. 7.

Figure 7:
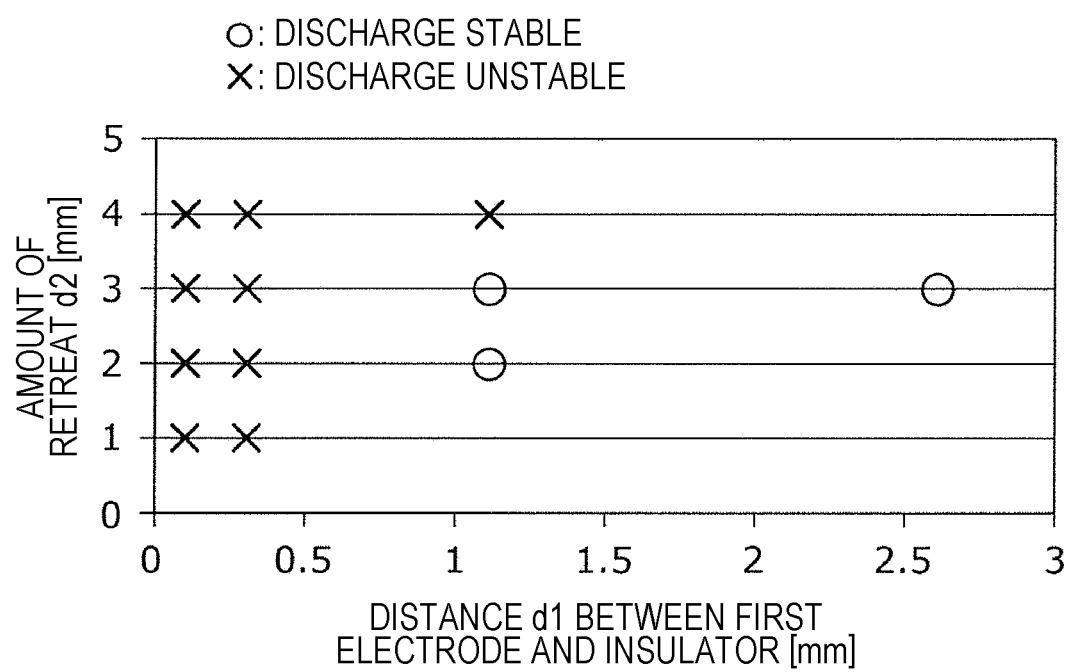
FIG. 7 is a graph illustrating the stability of plasma with respect to the distance between the first electrode and the insulator and the amount of retreat of an end surface of the first electrode in the first embodiment.

FIG. 7 illustrates the stability of the plasma 4 with respect to the distance (width d1) between the first electrode 30 and the insulator 50 and the amount of retreat d2 of the end surface 33 of the first electrode 30. In FIG. 7, the horizontal axis indicates the width d1, and the vertical axis indicates the amount of retreat d2. In FIG. 7, the circle (O) represents that the amount of precipitates of silica is very small and the discharge is stable, while the cross (X) represents that a considerable amount of precipitates is observed and the discharge is unstable. When the flickering of discharge was visually observed, the discharge was found to be unstable. When the continuation of a certain brightness of discharge light was observed, the discharge was found to be stable.

FIG. 7 shows that, when the width d1 is smaller than 1 mm (more specifically, about 0.1 mm or 0.3 mm), the discharge is not stable regardless of the amount of retreat d2. FIG. 7 also shows that, when the width d1 is 1.1 mm, no precipitates of silica are observed and the discharge is stable if the amount of retreat d2 is 2 mm or 3 mm.

FIGS. 7 and 8 show that, even when the width d1 is 1.1 mm, precipitates 90x of silica are observed and the discharge is unstable if the amount of retreat d2 is 4 mm. FIG. 8 illustrates the results of observing the first electrode 30 and the insulator 50 as viewed from the opening 51 of the insulator 50 when the width d1 is 1.1 mm and the amount of retreat d2 is 4 mm as shown in FIG. 7.

Based on the above-described results, in the liquid treatment device 1 according to the first embodiment, the end surface 33 of the first electrode 30 retreats from the opening 51 of the insulator 50 by 0 to 3 mm.

Thus, a discharge is more likely to be generated between the end surface 33 of the first electrode 30 and the gas-liquid interface, and the generation of a discharge between the first electrode 30 and the insulator 50 is reduced. Precipitates 90x such as silica are less likely to be formed. As a result, the discharge becomes more stable, and the liquid treatment device 1 is able to generate the plasma 4 more stably.

FIG. 7 also shows that no precipitates are observed and the discharge is stable when the width d1 is 2.6 mm and the amount of retreat d2 is 3 mm.

When the end surface 33 of the first electrode 30 protrudes from the opening 51, the plasma 4 can also be generated stably. The reason for this is that a discharge is generated mostly between the end surface 33 and the gas-liquid interface, and the generation of a discharge between the electrode portion 31 and the inner surface of the insulator 50 is reduced.

If the amount of protrusion d3 of the end surface 33 is 3 mm or smaller, the gas 3 is more likely to cover the entirety of the electrode portion 31 including the end surface 33, thereby making the discharge more stable. More specifically, when the amount of protrusion d3 is 0 to 3 mm, the discharge is stabilized and the plasma 4 can be generated stably. If the gas 3 is able to stably cover the electrode portion 31 by increasing the amount of gas 3, the amount of protrusion 3d may be greater than 3 mm.

1-4-3. Influence of Flow Rate of Gas on Plasma

The relationship between the amount of retreat d2 and the flow rate (flow volume) of the gas 3 supplied from the gas supply pump 60 will be discussed below.

Under the same conditions as those discussed with reference to FIGS. 7 and 8, by changing the amount of retreat d2 and the flow rate, the stability of discharge was observed in accordance with a combination of the amount of retreat d2 and the flow rate. The results are shown in FIG. 9.

Figure 9:
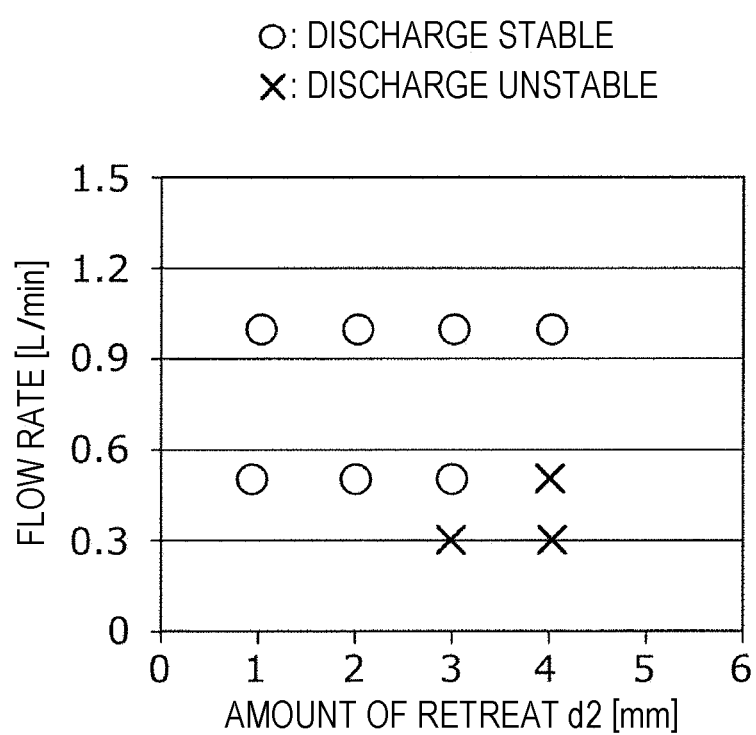
FIG. 9 is a graph illustrating the stability of plasma with respect to the amount of retreat of the end surface of the first electrode and the flow rate in the first embodiment.

FIG. 9 illustrates the stability of the plasma 4 with respect to the amount of retreat d2 of the end surface 33 of the first electrode 30 and the flow rate. In FIG. 9, the horizontal axis indicates the amount of retreat d2, and the vertical axis indicates the flow rate. In FIG. 9, the representation of the circle (0) and that of the cross (X) are similar to those in FIG. 7. The distance (width d1) between the outer surface of the electrode portion 31 and the inner surface of the insulator 50 is 1.1 mm.

FIG. 9 shows that, when the flow rate is 0.5 L/min, no precipitates are found and the discharge is stable if the amount of retreat d2 is 1 to 3 mm, while precipitates are found and the discharge is unstable if the amount of retreat d2 is 4 mm. FIG. 9 also shows that, even when the amount of retreat d2 is 4 mm, if the flow rate is 1.0 L/min, no precipitates are found and the discharge is stable.

Figure 10A:
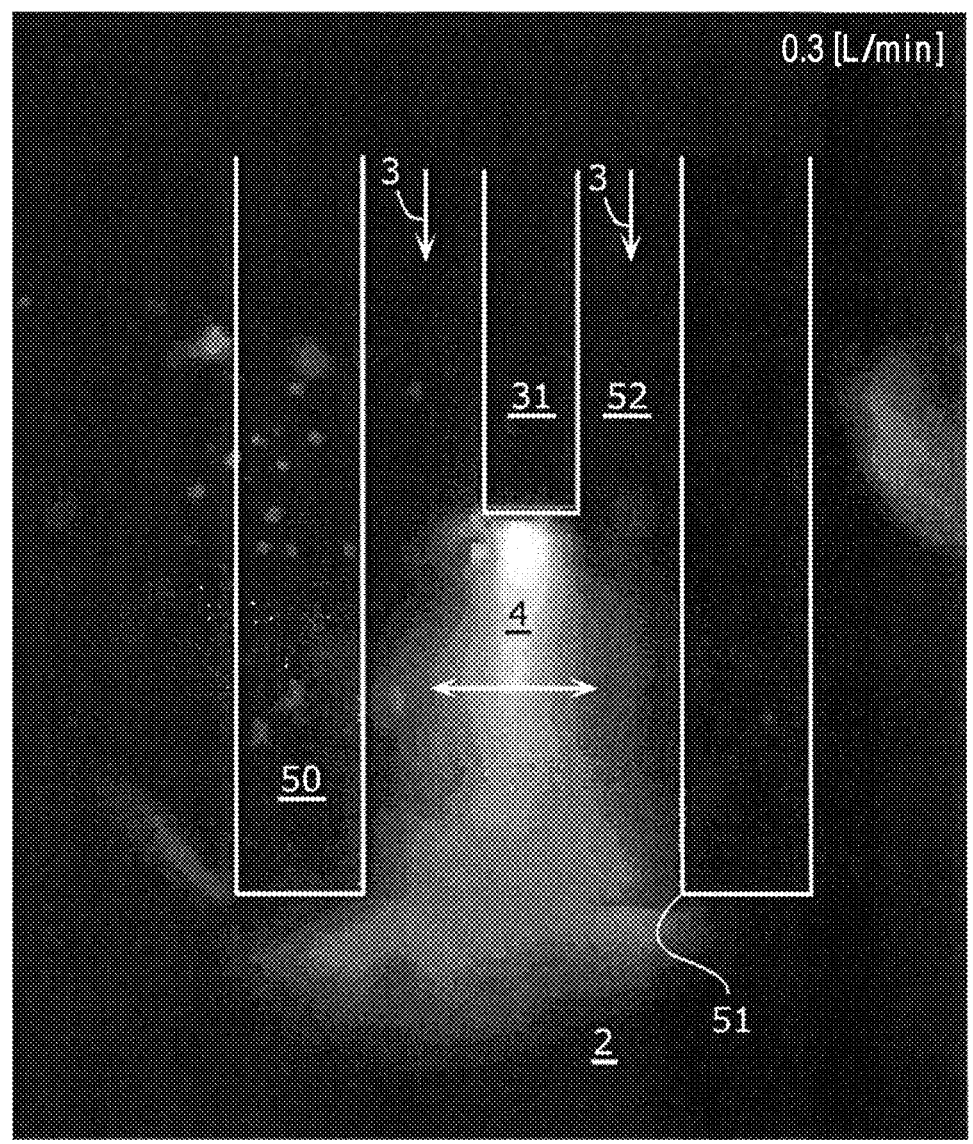
FIG. 10A illustrates the results of observing the first electrode and the insulator as viewed from the lateral side of the insulator when the amount of retreat is 4 mm and the flow rate is 0.3 L/min as shown in FIG. 9.
Figure 10B:
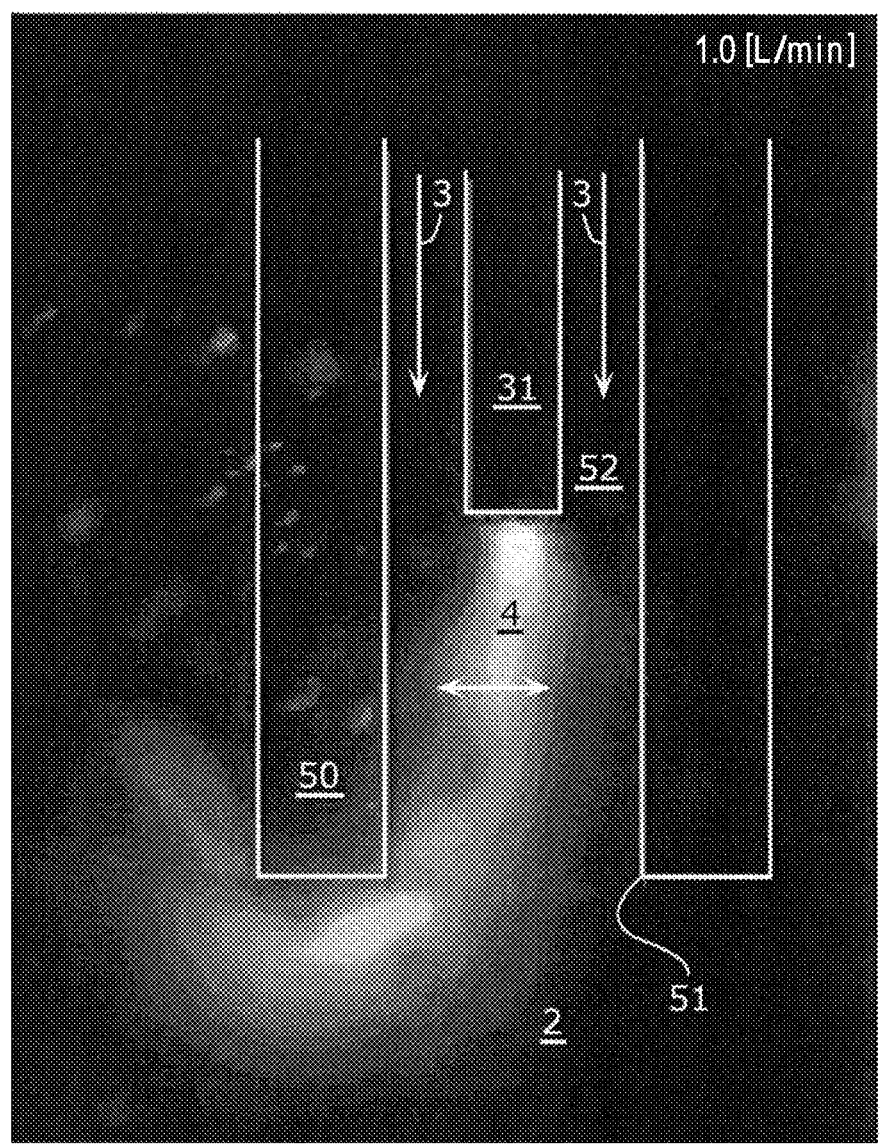
FIG. 10B illustrates the results of observing the first electrode and the insulator as viewed from the lateral side of the insulator when the amount of retreat is 4 mm and the flow rate is 1.0 L/min as shown in FIG. 9.

FIGS. 10A and 10B illustrate the results of observing the first electrode 30 and the insulator 50 as viewed from the lateral side of the insulator 50 under the condition that the amount of retreat d2 is 4 mm as shown in FIG. 9. More specifically, FIG. 10A illustrates the results when the flow rate is 0.3 L/min, while FIG. 10B illustrates the results when the flow rate is 1.0 L/min.

In FIGS. 10A and 10B, for making it easy to observe the first electrode 30 and the insulator 50 from the lateral side, the insulator 50 made of transparent quartz is used. For easy understanding of the positional relationship between the first electrode 30 and the space 52, the schematic configurations of the first electrode 30 and the insulator 50 are indicated by the white solid lines.

Based on a comparison between FIGS. 10A and 10B, as the flow rate is greater, the plasma 4 follows the flow of the gas 3 more accurately and spreads less toward the insulator 50 (that is, in the horizontal direction). In this manner, adjusting of the flow rate can control the area where the plasma 4 is generated. More specifically, adjusting of the flow rate makes it possible to control the exposure of the insulator 5 to the plasma 4.

In view of this point, in the liquid treatment device 1 according to the first embodiment, the flow rate of the gas 3 supplied from the gas supply pump 60 is 0.5 L/min or greater.

As the flow rate of the gas 3 is greater, the plasma 4 less spreads toward the insulator 50. Thus, the surface of the insulator 50 is less likely to be exposed to the plasma 4, and the formation of the precipitates 90x such as silica is reduced. As a result, the discharge becomes more stable, and the liquid treatment device 1 is able to generate the plasma 4 more stably.

As the flow rate of the gas 3 is smaller, the plasma 4 spreads more toward the insulator 50. However, if the end surface 33 of the first electrode 30 protrudes from the opening 51, the spread plasma 4 only negligibly contacts the inner surface of the insulator 50. If the end surface 33 protrudes from the opening 51 or if the amount of retreat d2 is small, the flow rate of the gas 3 may be smaller than 0.5 L/min.

Second Embodiment

A second embodiment will now be described below. In the second embodiment, different points from the first embodiment will mainly be discussed, and the same structure, operation, and advantages as those of the first embodiment may be omitted.

2-1. Configuration

Figure 11:
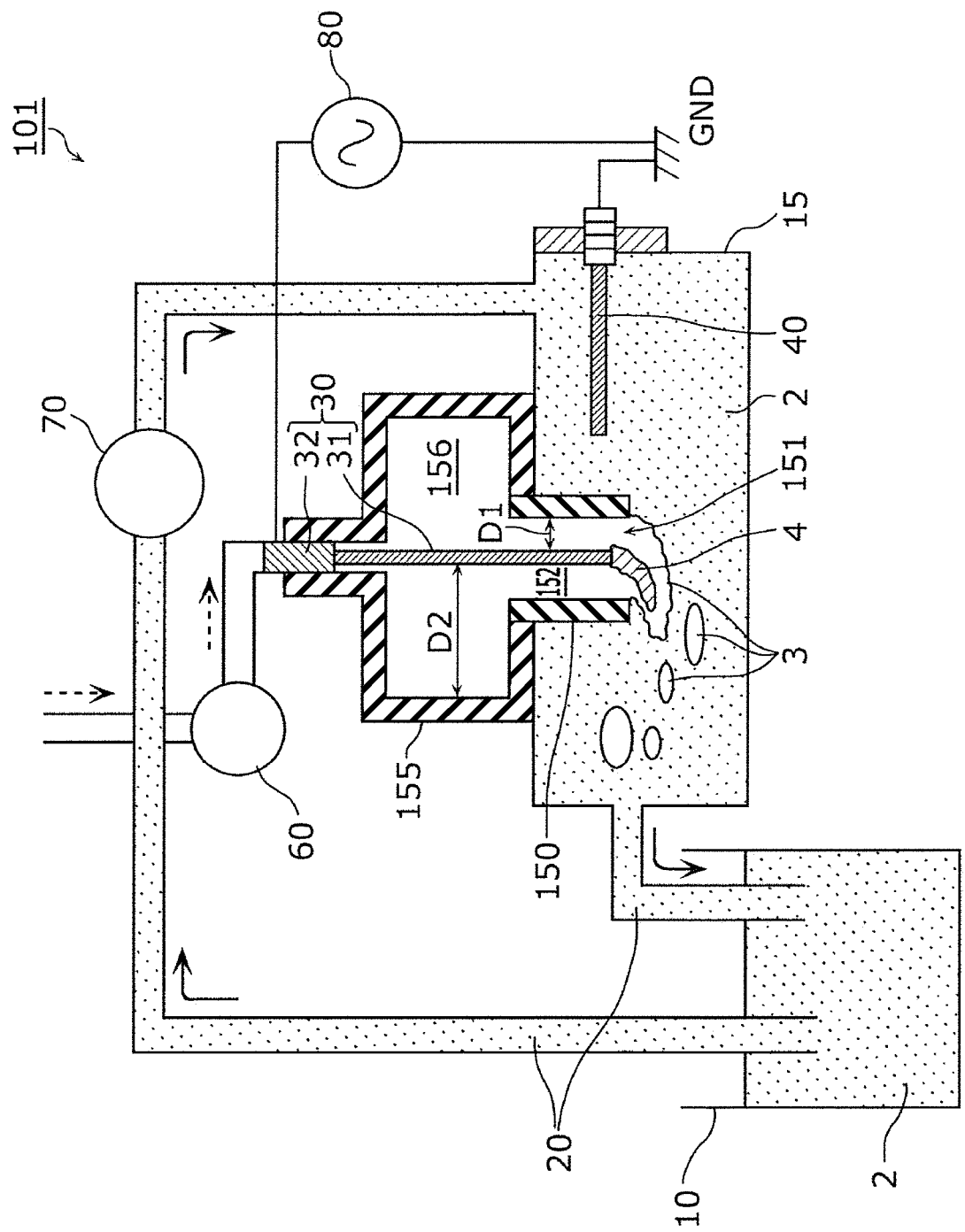
FIG. 11 is a schematic view illustrating the configuration of a liquid treatment device according to a second embodiment.

FIG. 11 illustrates the configuration of a liquid treatment device 101 according to the second embodiment. The liquid treatment device 101 differs from the liquid treatment device 1 of the first embodiment in that first and second insulators 150 and 155 are provided instead of the insulator 50 and in that a first electrode 30 is fixed to the top surface of a reaction tank 15 instead of being fixed to the bottom surface thereof. However, the first electrode 30 may be fixed to the bottom surface or the side surface of the reaction tank 15. Similarly, the first electrode 30 in the first embodiment may be fixed to the top surface or the side surface of the reaction tank 15.

2-1-1. First Insulator

The first insulator 150 is substantially the same as the insulator 50 in the first embodiment but differs from the insulator 50 in that the second insulator 155 is connected to the rear side of the first insulator 150. More specifically, the first insulator 150 is a tubular insulator which surrounds only part of the electrode portion 31 of the first electrode 30. For example, the first insulator 150 is a circular tubular member having an opening 151, and surrounds the outer surface of the forward side (front side) of the electrode portion 31 of the first electrode 30 via a space 152.

The first insulator 150 and the electrode portion 31 are coaxially disposed. A first distance D1, which is the distance between the inner surface of the first insulator 150 and the outer surface of the first electrode 30 (more specifically, the electrode portion 31), is the same as the width d1 of the space 52 in the first embodiment. The first distance D1 is 1 mm or greater, and may be 1 to 3 mm, for example.

The first insulator 150 is fixed to the wall surface of the reaction tank 15, for example. The gap between the first insulator 150 and the wall surface of the reaction tank 15 may be filled with adhesive such as epoxy adhesive. Alternatively, the first insulator 150 may be fixed to and supported by the second insulator 155. In the second embodiment, the rear side of the first insulator 150 is interconnected to the forward side of the second insulator 155.

The material, size, and functions of the first insulator 150 are the same as those of the insulator 50 in the first embodiment.

2-1-2. Second Insulator

The second insulator 155 is a tubular insulator which surrounds the outer surface of the first electrode 30 via a space 156. The second insulator 155 is interconnected to the rear side of the first insulator 150 so that the inside of the second insulator 155 can communicate with the inside of the first insulator 150. More specifically, the space 152 of the first insulator 150 and the space 156 of the second insulator 155 communicate with each other.

The second insulator 155 is a tubular member which surrounds the outer surface of the rear side of the electrode portion 31 of the first electrode 30. The rear side of the electrode portion 31 is the upstream side in the flowing direction of a gas supplied from a gas supply pump 60. The forward side of the electrode portion 31 is the downstream side in the flowing direction of a gas. That is, the forward side of the electrode portion 31 is the lower side of FIG. 11, while the rear side of the electrode portion 31 is the upper side of FIG. 11. The second insulator 155 surrounds the rear side of the electrode portion 31, and the first insulator 150 surrounds the forward side of the electrode portion 31, as described above. The second insulator 155 may not necessarily surround a screw portion 32 or the end surface of the rear side of the electrode portion 31.

As shown in FIG. 11, the distance between the inner surface of a first portion of the second insulator 155 near the screw portion 32 and the outer surface of the first electrode 30 is narrow, while the distance between the inner surface of a second portion of the second insulator 155 and the outer surface of the first electrode 30 is wide. A second distance D2, which is the shortest distance between the inner surface of the second portion of the second insulator 155 and the outer surface of the first electrode 30, is greater than the first distance D1. The second distance D2 is determined by the voltage applied to between the first and second electrodes 30 and 40 by the power supply source 80. Details of this will be discussed later.

The shape of the second insulator 155 is a circular tube, for example, but is not restricted thereto. The shape of the second insulator 155 may be a square tube. Alternatively, the second insulator 155 may be configured such that the distance between the first electrode 30 and the inner surface of the second insulator 155 progressively changes, such as in a funnel-like shape. In this case, too, the second insulator 155 includes the following inner portion which surrounds the outer surface of the first electrode 30. The shortest distance between this inner portion and the outer surface of the first electrode 30 is greater than the first distance D1.

In the example in FIG. 11, the second insulator 155 is a circular tubular member, the forward side and the rear side of which are both partially closed. At the forward side of the second insulator 155, a circular opening having a diameter substantially the same as the outer diameter of the first insulator 150 is provided. The first insulator 150 is interconnected to this circular opening. At the rear side of the second insulator 155, a circular opening having a diameter substantially the same as the outer diameter of the screw portion 32 is provided. The screw portion 32 is fixed to this circular opening. A female thread to be screwed with the male thread of the screw portion 32 may be provided on the circular opening at the rear side.

The second insulator 155 is a shallow tubular member, for example, but is not restricted thereto. The second insulator 155 may be a tubular member elongated in the axial direction of the electrode portion 31, or may be a hollow polyhedron, such as a hollow rectangular parallelepiped or cube.

The material for the second insulator 155 is not restricted to a specific insulating material, and may be made of acrylic resin such as polymethyl methacrylate (PMMA), polyphenylenesulfide (PPS), polyetheretherketone (PEEK), alumina ceramic, quartz, magnesia, or zirconia. The second insulator 155 may be made of a material different from that of the first insulator 150. Alternatively, the first and second insulators 150 and 155 may be integrally formed by the same material.

2-2. Advantages

Advantages obtained by providing the second insulator 155 on the rear side of the first insulator 150 will be discussed below, together with the underlying knowledge forming the basis of the second embodiment.

2-2-1. Underlying Knowledge Forming Basis of Second Embodiment and Principal Features of Second Embodiment When a high voltage is applied to an electrode surrounded by a tubular insulator having an opening, such as that as the first electrode 30, via a space in order to generate plasma, the Maxwell stress tensor is applied to the gas-liquid interface of a subject liquid near the opening of the insulator in accordance with the electric field generated in the gas-liquid interface. Because of this Maxwell stress tensor, after conducting discharging continuously for a long time (for example, fifty minutes or longer), the liquid may penetrate into the insulator via the inner surface of the insulator through the opening. This may make the discharge unstable.

To address this issue, in the liquid treatment device 101 according to the second embodiment, the forward portion of the outer surface of the first electrode 30 is covered with the tubular first insulator 150, and also, the rear portion of the outer surface of the first electrode 30 is covered with the tubular second insulator 155. The rear side of the first insulator 150 and the forward side of the second insulator 155 are connected to each other.

In this case, the second distance D2 between the outer surface of the first electrode 30 and the inner surface of the second insulator 155 is set to be greater than the first distance D1 between the outer surface of the first electrode 30 and the inner surface of the first insulator 150. With this configuration, the electric field generated on the surface of the inner portion of the second insulator 155 becomes smaller than that on the inner surface of the first insulator 150, and the Maxwell stress tensor applied to the inner surface of the second insulator 155 is also decreased accordingly. The liquid 2 penetrated through the opening 151 of the first insulator 150 is less likely to enter the second insulator 155, thereby reducing the possibility that the liquid 2 will reach the rear portion of the first electrode 30.

The second distance D2 is determined by the voltage applied to between the first and second electrodes 30 and 40, for example. The experiment and simulation results, which will be discussed later, show that the second distance D2 may be set to be 2.6 mm or greater if the voltage is 5 kV or lower, and the second distance D2 may be set to be 5.0 mm or greater if the voltage is 5 kV or higher. Then, the electric field generated on the inner surface of the second insulator 155 is sufficiently reduced. Setting of a suitable value of the second distance D2 with respect to the applied voltage may contribute to considerably reducing the penetration of the liquid 2 into the inner surface of the second insulator 155.

Similarly, in the liquid treatment device 1 according to the first embodiment, the first distance (width d1) may be determined by the voltage applied to between the first and second electrodes 30 and 40. The width d1 may be set to be 2.6 mm or greater if the voltage is 5 kV or lower, and the width d1 may be set to be 5.0 mm or greater if the voltage is 5 kV or higher.

In the first or second embodiment, the first distance (width d1) or the second distance D2 may be set to be 10.0 mm or smaller. Then, bubbles can be generated more suitably.

2-2-2. Experiment Results

In the second embodiment, a positive-polarity pulse voltage having a peak voltage of 5 kV was applied to between the first and second electrodes 30 and 40 to generate plasma between the first electrode 30 and the liquid 2. Then, it was observed whether the liquid 2 would penetrate into the first and second insulators 150 and 155. As the liquid 2, tap water was used.

The first distance D1 was 1.1 mm, and the second distance D2 was 2.6 mm. Discharging was continuously conducted for two hours. The results of the experiment are shown in FIGS. 12 and 13.

Figure 12:
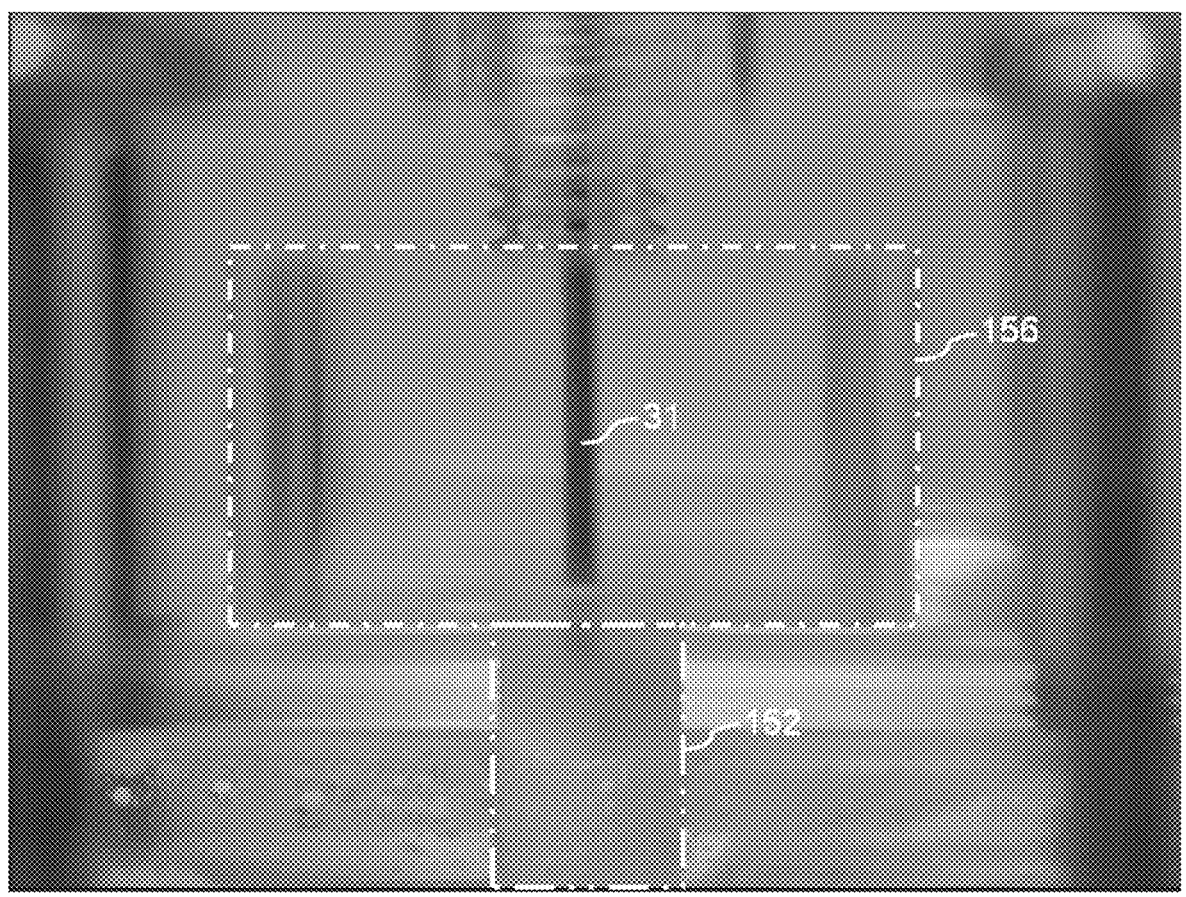
FIG. 12 illustrates the results of observing a second insulator of the liquid treatment device according to the second embodiment as viewed from the lateral side of the second insulator.
Figure 13:
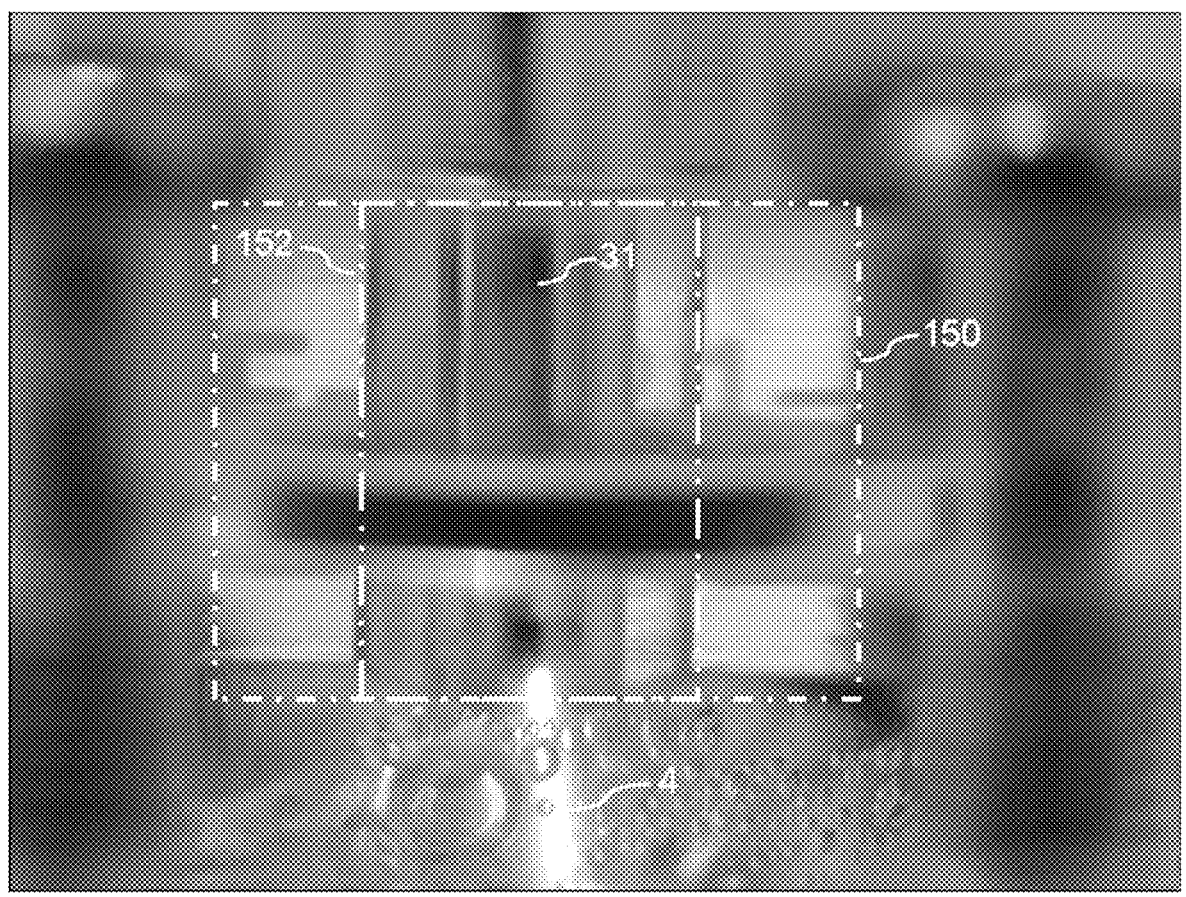
FIG. 13 illustrates the results of observing a first insulator of the liquid treatment device according to the second embodiment as viewed from the lateral side of the first insulator.

FIG. 12 illustrates the results of observing the second insulator 155 of the liquid treatment device 101 of the second embodiment as viewed from the lateral side of the second insulator 155. FIG. 13 illustrates the results of observing the first insulator 150 of the liquid treatment device 101 of the second embodiment as viewed from the lateral side of the first insulator 150. For making it easy to observe the inside of the first and second insulators 150 and 155, the first and second insulators 150 and 155 made of transparent quartz are used.

The substantially rectangular region indicated by the white long dashed dotted lines at the center of FIG. 12 is a region surrounded by the second insulator 155, that is, the space 156. The black portion extending in the top-bottom direction at substantially the center of the space 156 indicates the electrode portion 31 of the first electrode 30. The substantially rectangular region indicated by the white long dashed double-dotted lines which surrounds the electrode portion 31 (not clearly shown) in the lower side of FIG. 12 is a region surrounded by the first insulator 150, that is, the space 152. At the upper side of FIG. 12, the portion which surrounds the electrode portion 31 is the screw portion 32.

In FIG. 12, the electrode portion 31 in the space 156 is clearly shown, and it is seen that the liquid 2 does not penetrate into the space 156. In contrast, in FIG. 12, the forward side of the electrode portion 31 surrounded by the first insulator 150 is not clearly shown, and it is seen that the liquid is penetrated into the space 152.

The vertically extending rectangular region (circular tubular portion) indicated by the white long dashed dotted lines at the center of FIG. 13 represents the first insulator 150. The black portion vertically extending along the center of the first insulator 150 is the electrode portion 31 of the first electrode 30. The white portion extending from the bottom of the electrode portion 31 downward is the plasma 4 generated by discharge. The black ring-like portion extending horizontally at the center of FIG. 13 is another member which supports the first insulator 150.

In FIG. 13, the electrode portion 31 within the first insulator 150 is not clearly shown, and it is seen that the liquid 2 is penetrated into the first insulator 150 (the space 152 indicated by the white long dashed double-dotted lines). It was also observed that water droplets adhered to along the inner surface of the first insulator 150, though they are not easily seen in FIG. 13.

The above-described results show that the liquid 2 penetrated into the first insulator 150 does not reach the second insulator 155 by setting the second distance D2 to be greater than the first distance D1. That is, the results show that providing of the second insulator 155 reduces the penetration of the liquid 2 into the rear side of the electrode portion 31.

Discharging was conducted continuously for two hours under the conditions that the first distance D1 was 2.6 mm and the second distance D2 was changed to 4.6 mm, 7.1 mm, and 9.6 mm. After this experiment, the penetration of the liquid 2 into the first and second insulators 150 and 155 was not observed. The results show that the electric fields generated on the inner surfaces of the first and second insulators 150 and 155 are sufficiently reduced when the first and second distances D1 and D2 are 2.6 mm or greater.

2-2-3. Simulation Results

Results of simulating the relationship between the applied voltage and the second distance D2 will be discussed below. The electric field generated on the inner surface of the second insulator 155 was calculated to be $1.6 \times 10^6$ V/m by simulations when the voltage of 5 kV was applied to between the first and second electrodes 30 and 40 and the second distance D2 was 2.6 mm. As the electric field is lower, the Maxwell stress tensor is smaller. Hence, it is estimated that, in the environment of an electric field of $1.6 \times 10^6$ V/m or lower, the liquid 2 will not penetrate into the second insulator 155.

Figure 14:
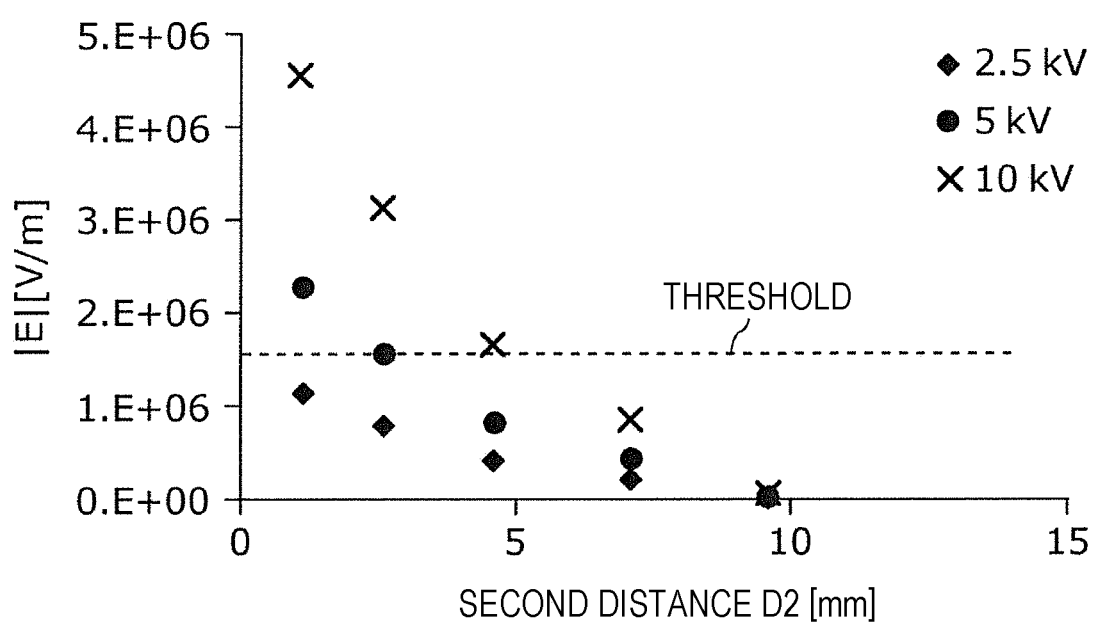
FIG. 14 is a graph illustrating the results of simulating the relationship between a second distance from the first electrode to the second insulator and an electric field generated on the inner surface of the second insulator in the second embodiment.

FIG. 14 illustrates the results of simulating the relationship between the second distance D2 from the first electrode 30 to the second insulator 155 and the electric field generated on the inner surface of the second insulator 155. More specifically, FIG. 14 illustrates the results of simulating the electric field when the voltage applied to between the first and second electrodes 30 and 40 is 2.5 kV, 5 kV, and 10 kV. In the graph, the electric fields generated when the second distance D2 is 1.1 mm, 2.6 mm, 4.9 mm, 7.1 mm, and 9.6 mm are shown.

The simulation results shown in FIG. 14 indicate how the absolute value of the electric field generated on the inner surface of the second insulator 155 changes in accordance with the second distance D2. The dashed line in FIG. 14 represents a threshold ($1.6 \times 10^6$ V/m) of the electric field based on the above-described experiment results at which the liquid 2 will not probably penetrate into the second insulator 155. If the electric field is equal to or lower than the threshold, the liquid 2 is less likely to penetrate into the second insulator 155.

The simulation results in FIG. 14 show that, when the applied voltage is as high as 10 kV or lower, the electric field generated on the inner surface of the second insulator 155 can be reduced to $1.6 \times 10^6$ V/m or lower if the second distance D2 is set to be 5 mm or greater. That is, the liquid 2 is less likely to penetrate into the second insulator 155.

When the applied voltage is as low as 5 kV or lower, the electric field generated on the inner surface of the second insulator 155 can be reduced to $1.6 \times 10^6$ V/m or lower if the second distance D2 is set to be 2.6 mm or greater.

In this manner, in the second embodiment, the second distance D2 is set in accordance with the voltage applied to between the first and second electrodes 30 and 40, thereby making it possible to sufficiently reduce the electric field generated on the inner surface of the second insulator 155. Thus, the liquid 2 is less likely to penetrate into the second insulator 155. As a result, the stable generation of plasma is achieved.

Third Embodiment

A third embodiment will now be described below. In the third embodiment, different points from the first embodiment will mainly be discussed, and the same structure, operation, and advantages as those of the first embodiment may be omitted.

3-1. Configuration

Figure 15:
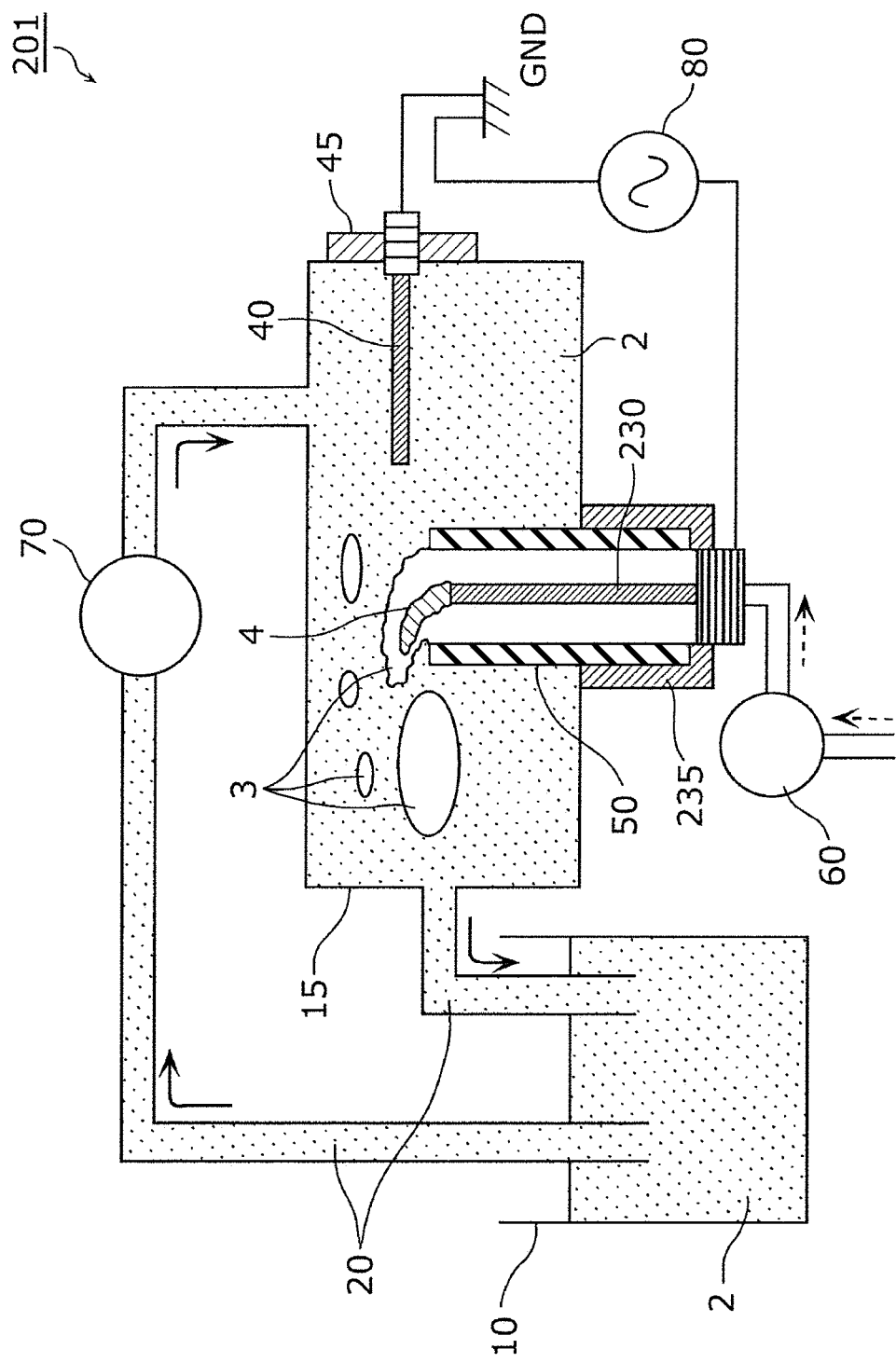
FIG. 15 is a schematic view illustrating the configuration of a liquid treatment device according to a third embodiment.

FIG. 15 illustrates the configuration of a liquid treatment device 201 according to the third embodiment. As shown in FIG. 15, the liquid treatment device 201 differs from the liquid treatment device 1 of the first embodiment in that a first electrode 230 and a first holding portion 235 are provided instead of the first electrode 30 and the first holding portion 35, respectively.

Figure 16:
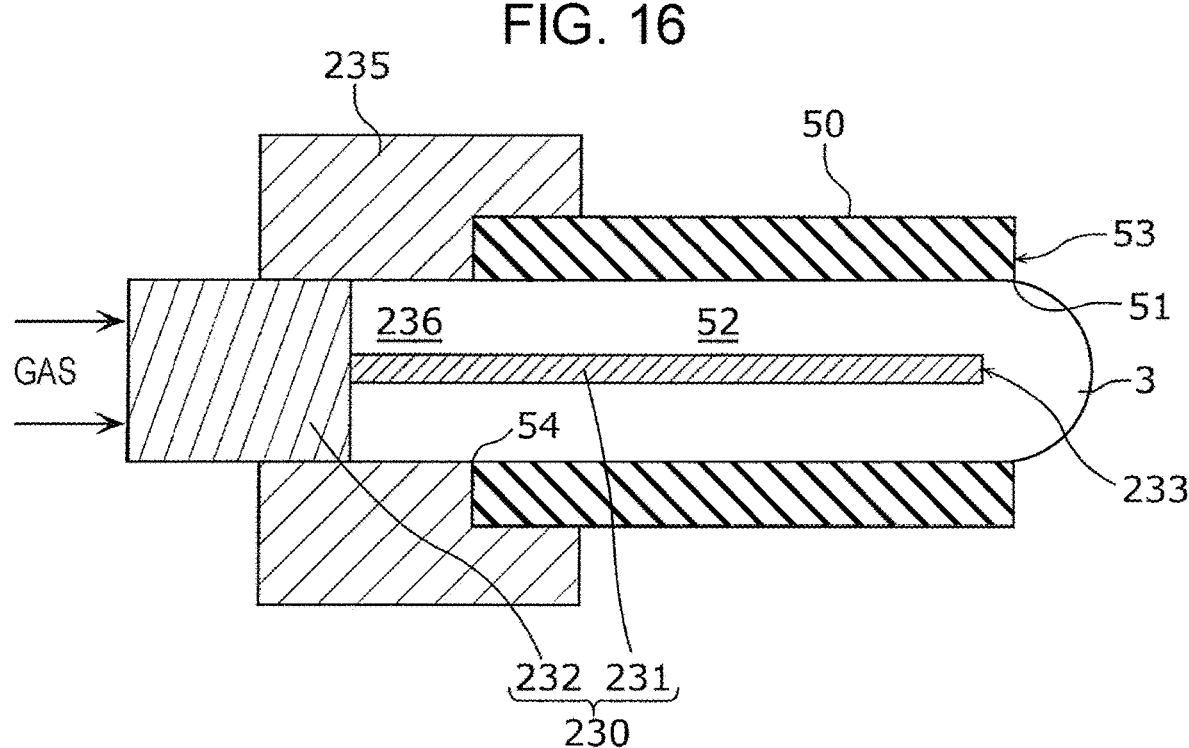
FIG. 16 is a sectional view illustrating a first electrode and an insulator in the third embodiment.
Figure 17:
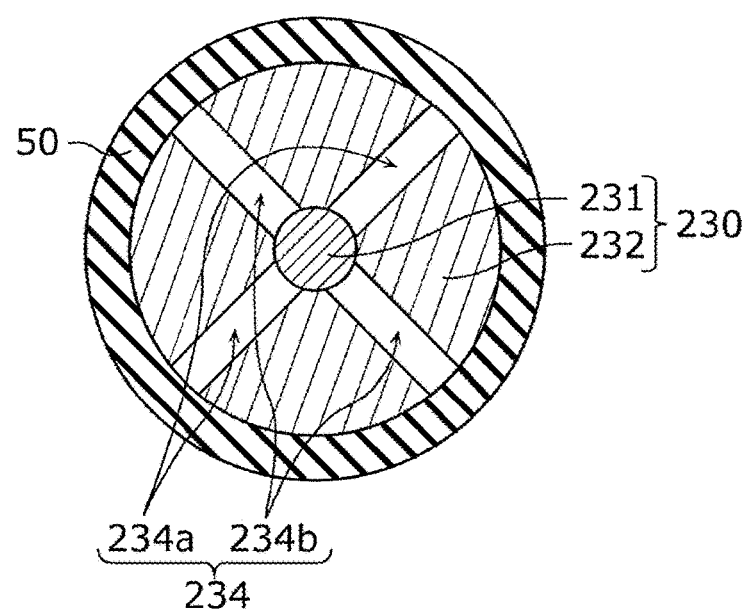
FIG. 17 is a front view illustrating the first electrode and the insulator as viewed from the forward end thereof in the third embodiment.

FIG. 16 is a sectional view illustrating the first electrode 230 and an insulator 50 in the third embodiment. FIG. 17 is a front view illustrating the first electrode 230 and the insulator 50 as viewed from the forward end thereof in the third embodiment. In FIG. 17, the first holding portion 235 is not shown. For easy understanding of the schematic configurations of the individual elements in FIG. 17, the hatching used for an element in FIG. 16 is also used for the same element in FIG. 17.

3-1-1. First Electrode

As shown in FIGS. 16 and 17, the first electrode 230 includes an electrode portion 231 and a screw portion 232. The first electrode 230 is one of a pair of electrodes for generating plasma 4. The first electrode 230 is used as a reaction electrode around which the plasma 4 is generated.

The electrode portion 231 is an elongated cylindrical electrode portion provided on the forward side of the first electrode 230. The axial length of the electrode portion 231 is the same as that of the insulator 50, for example, or may be longer than that of the insulator 50. If the electrode portion 231 is disposed such that an end surface 233 at the forward side of the electrode portion 231 retreats from the opening 51 of the insulator 50, the rear side of the electrode portion 231 protrudes from an opening 54 at the rear side of the insulator 50. The length of the electrode portion 231 is 15 to 30 mm, for example, but is not restricted thereto.

The screw portion 232 is disposed on the rear side of the electrode portion 231 and is an example of a cylindrical support portion which supports the electrode portion 231. The screw portion 232 is thicker than the electrode portion 231. A gas supply hole 234 is formed in the screw portion 232, as shown in FIG. 17.

The gas supply hole 234 is a hole for allowing the gas 3 supplied from the gas supply pump 60 to pass therethrough. The gas supply hole 234 is a through-hole which passes through the screw portion 232 in the axial direction, for example. In the third embodiment, the opening width of the gas supply hole 234 and the inner diameter of the insulator 50 are substantially the same.

As shown in FIG. 17, the gas supply hole 234 is formed in a cross shape, as viewed from the front side. The electrode portion 231 is pressed into the center of the cross-shaped gas supply hole 234 so that the screw portion 232 can support the electrode portion 231. The gas supply hole 234 is radially formed around the electrode portion 231, as viewed from the front side. More specifically, the gas supply hole 234 includes two through-holes 234a and 234b. The through-holes 234a and 234b each have an elongated rectangular opening in the radial direction of the screw portion 232 and cross at right angles at the center of the screw portion 232 as viewed from the front side. The length of each of the rectangular openings of the through-holes 234a and 234b is the same as the inner diameter of the insulator 50. The length of the rectangular opening is the length of the screw portion 232 in the radial direction, for example, and is the opening width of the gas supply hole 234. The width of the rectangular opening is smaller than the diameter of the electrode portion 231, for example.

The configuration of the gas supply hole 234 is not restricted to that shown in FIG. 17. The gas supply hole 234 may include only one of the through-holes 234a and 234b or include three or more through-holes.

3-1-2. First Holding Portion

The first holding portion 235 is a member for holding the first electrode 230. In the third embodiment, the first holding portion 235 holds the first electrode 230 and the insulator 50 and fixes them to certain positions of the reaction tank 15.

The first holding portion 235 holds the screw portion 232, as shown in FIG. 16. More specifically, a female thread (not shown) is formed on the inner surface of the first holding portion 235 and is screwed with a male thread (not shown) formed on the outer surface of the screw portion 232.

The first holding portion 235 is a tubular member having substantially the same inner diameter as that of the insulator 50. More specifically, as shown in FIG. 16, the first holding portion 235 has a space 236 which communicates with the gas supply hole 234 and the space 52 of the insulator 50. The inner diameter of the space 236 and that of the space 52 are substantially the same. The space 236 is part of a flow channel through which the gas 3 supplied from the gas supply pump 60 flows. The space 236 serves to stabilize the flow of the gas 3 output from the gas supply hole 234 and to guide the gas 3 to the space 52 of the insulator 50. The axial length of the space 236 is not particularly restricted. As the axial length of the space 236 is longer, the flow of the gas 3 is more stabilized.

3-2. Advantages

Advantages obtained by setting the opening width of the gas supply hole 234 to be substantially the same as the inner diameter of the insulator 50 will be discussed below, together with the underlying knowledge forming the basis of the third embodiment.

3-2-1. Underlying Knowledge Forming Basis of Third Embodiment

If a large distance (width d1 of the space 52) between the outer surface of the electrode portion 31 and the inner surface of the insulator 50 is set, that is, if a large inner diameter of the insulator 50 is set, the size of the gas supply hole for guiding a gas into the insulator 50 may become smaller than the inner diameter of the insulator 50. In this case, the width of the flow channel of the gas 3 supplied through the gas supply hole becomes discontinuous at the interface between the gas supply hole and the insulator 50. Because of this discontinuity of the width of the flow channel, a swirl may be generated in the gas 3 near the inner surface of the insulator 50, and the liquid 2 captured by this swirl may penetrate into the insulator 50 via the inner surface of the insulator 50.

Figure 18:
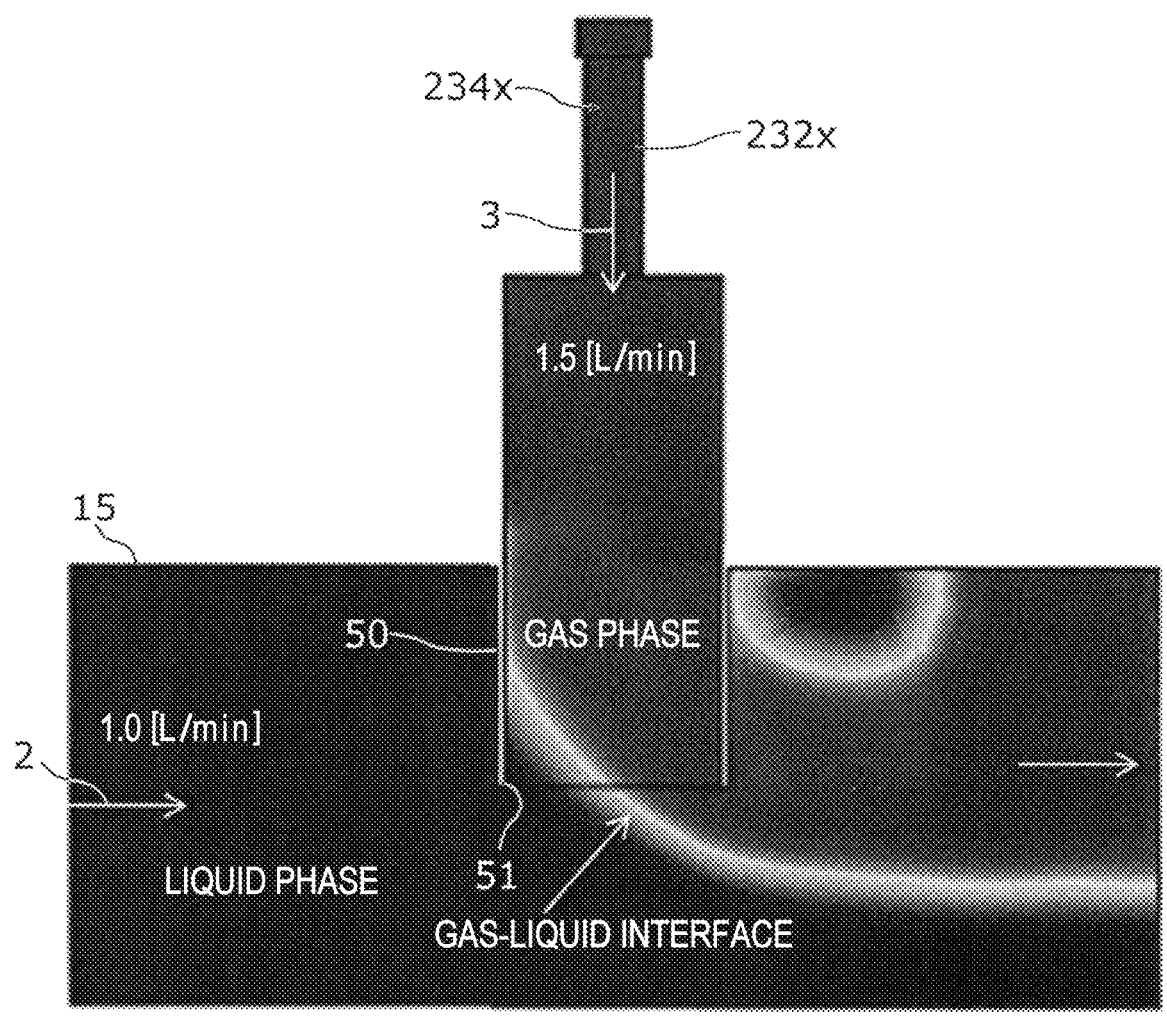
FIG. 18 illustrates the results of simulating the position of a gas-liquid interface near an insulator according to a comparative example of the third embodiment.
Figure 19:
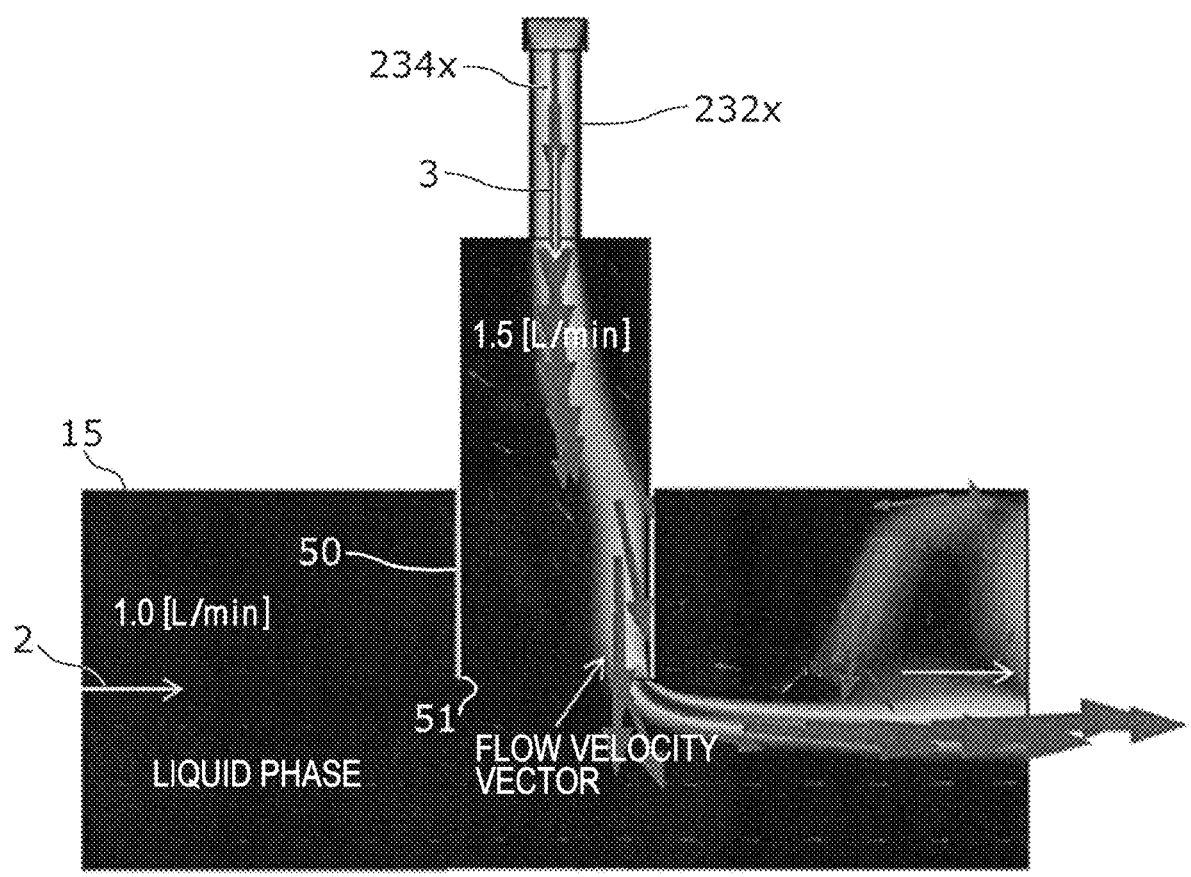
FIG. 19 illustrates the distribution of the flow velocity of a gas in the same simulations as in FIG. 18.
Figure 20:
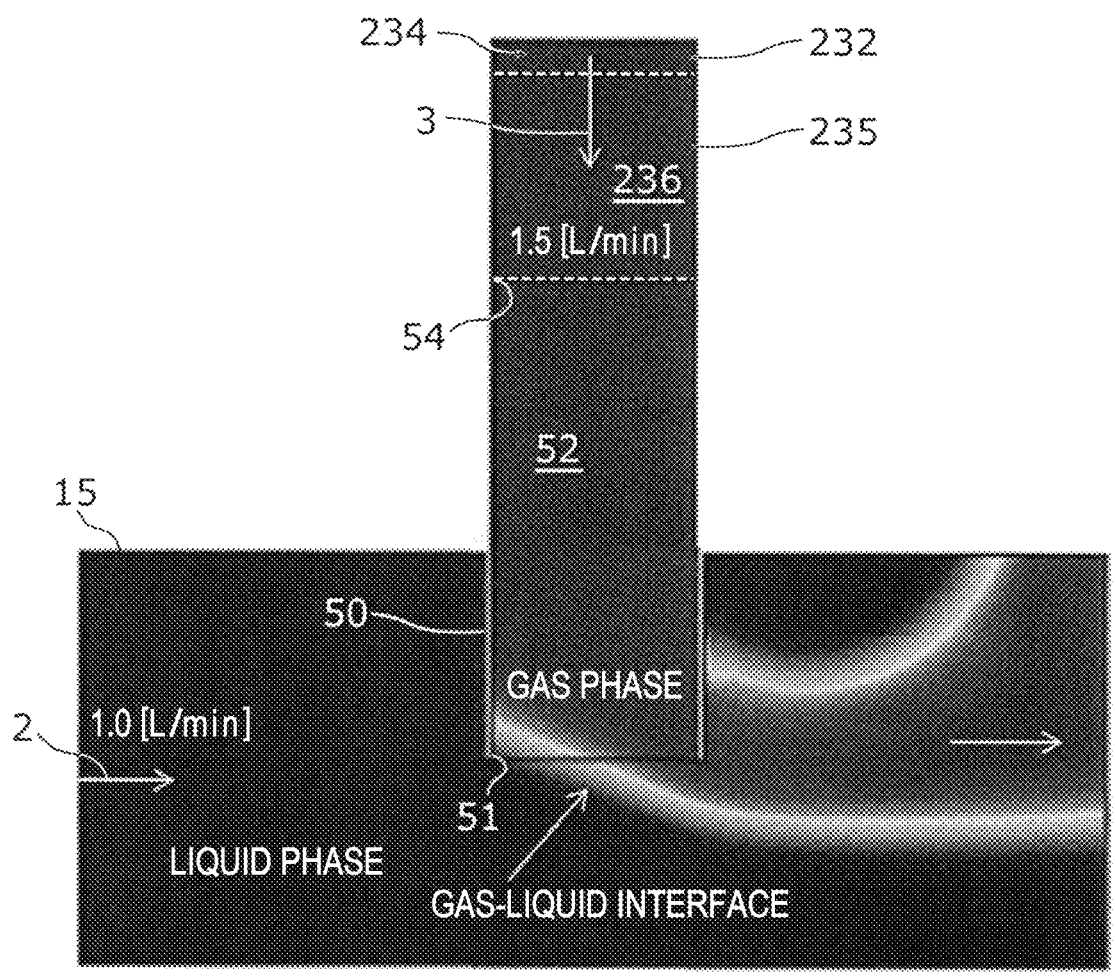
FIG. 20 illustrates the results of simulating the position of a gas-liquid interface near the insulator in the third embodiment.
Figure 21:
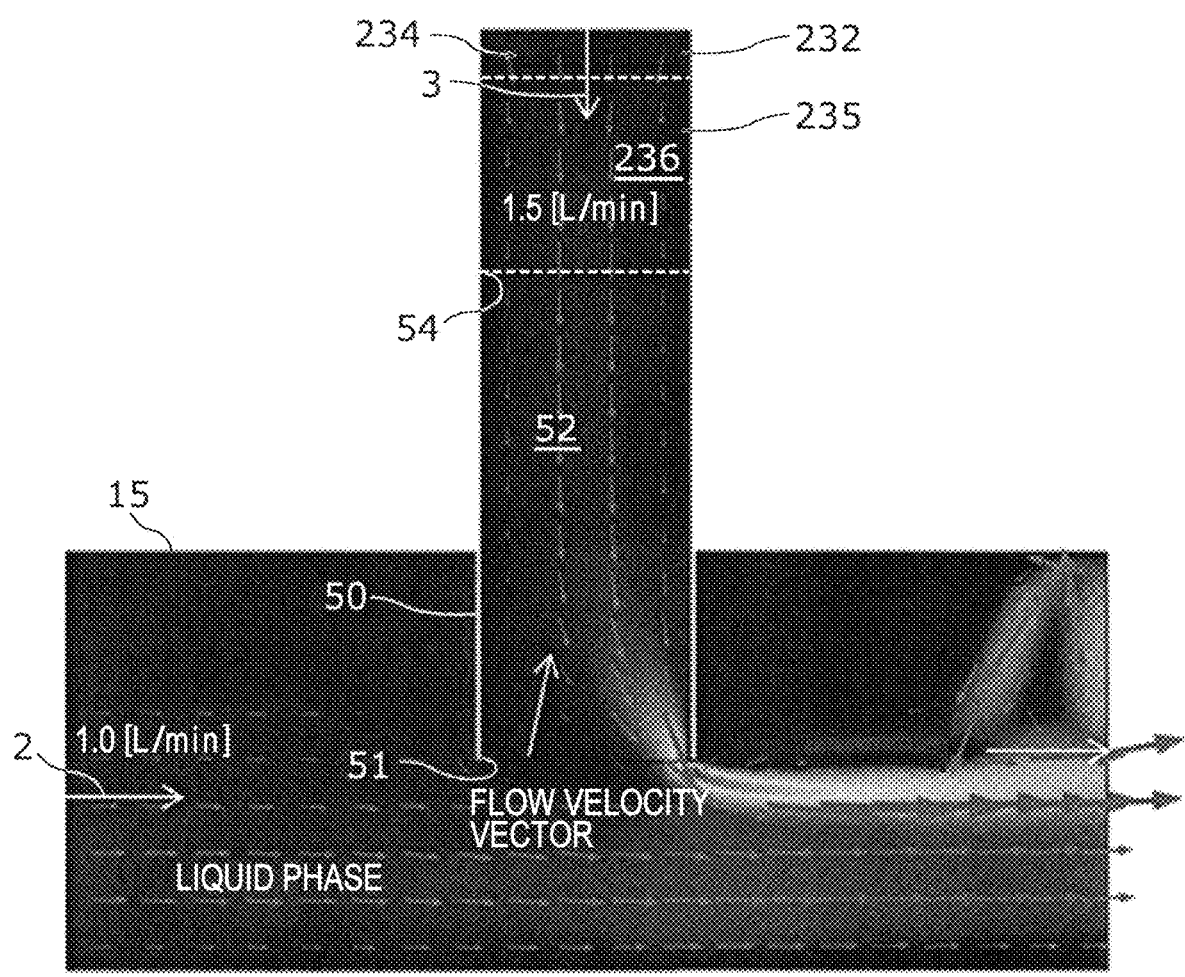
FIG. 21 illustrates the distribution of the flow velocity of a gas in the same simulations as in FIG. 20.

FIG. 18 illustrates the results of simulating (calculating numeric values) the position of the gas-liquid interface near the insulator 50 according to a comparative example of the third embodiment. FIG. 19 illustrates the distribution of the flow velocity of the gas 3 in the same simulations as in FIG. 18. For simple representation, in FIGS. 18 and 19, a screw portion 232x and the insulator 50 are illustrated as thin elements. FIGS. 20 and 21 are also illustrated in a similar manner.

In this comparative example, numeric values are calculated, assuming that the opening width of a gas supply hole 234x is 0.8 mm, the inner diameter of the insulator 50 is 3.0 mm, the flow rate of the gas 3 supplied through the gas supply hole 234x is 1.5 L/min, and the flow rate of the liquid 2 (tap water) circulating within a reaction tank is 1.0 L/min.

FIGS. 18 and 19 show that a swirl is generated near the inner surface of the insulator 50 and that the gas-liquid interface is drawn into the insulator 50 through the opening 51 because of the swirl.

3-2-2. Principal Features of Third Embodiment

To address this issue, in the liquid treatment device 201 according to the third embodiment, the opening width of the gas supply hole 234 and the inner diameter of the insulator 50 are set to be substantially the same, as shown in FIGS. 16 and 17. This stabilizes the distribution of the flow velocity of the gas 3 supplied to the inside of the insulator 50 and also stabilizes the configuration of the bubbles formed at the opening 51 of the insulator 50.

FIG. 20 illustrates the results of simulating (calculating numeric values) the position of the gas-liquid interface near the insulator 50 in the third embodiment. FIG. 21 illustrates the distribution of the flow velocity of the gas 3 in the same simulations as in FIG. 20.

In this case, numeric values are calculated, assuming that the opening width of the gas supply hole 234 is 3.0 mm, the inner diameter of the insulator 50 is 3.0 mm, the flow rate of the gas 3 supplied through the gas supply hole 234 is 1.5 L/min, and the flow rate of the liquid 2 circulating within the reaction tank 15 is 1.0 L/min.

FIGS. 20 and 21 show that the distribution of the flow velocity of the gas 3 within the insulator 50 is uniform. FIG. 20 shows that the gas-liquid interface is positioned near the opening 51 of the insulator 50 and only negligibly enters the insulator 50.

As described above, in the liquid treatment device 201 of the third embodiment, since the distribution of the flow velocity of the gas 3 within the insulator 50 is uniform, the liquid 2 is not drawn into the insulator 50. As a result, the stable generation of plasma is achieved.

In the third embodiment, the screw portion 232 may directly be inserted into the insulator 50. That is, without providing the space 236, the gas 3 passing through the gas supply hole 234 is directly guided into the space 52 of the insulator 50.

3-3. Modified Examples

Figure 22:
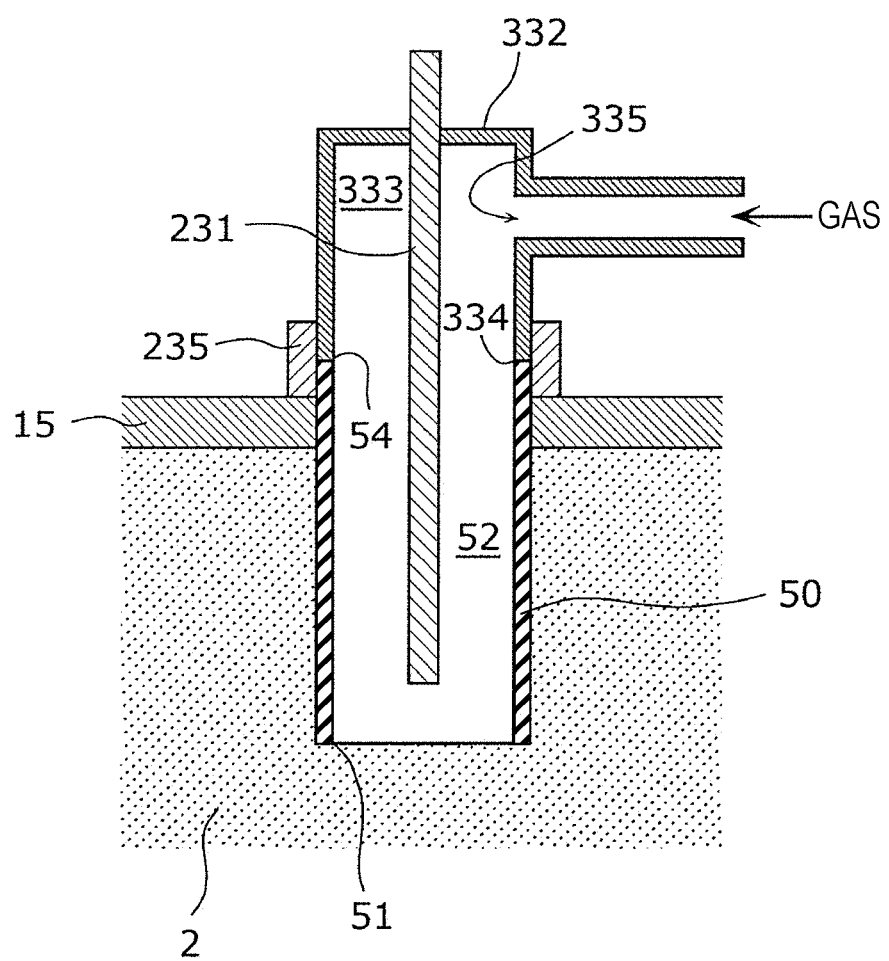
FIG. 22 is a sectional view illustrating the vicinities of a first electrode and an insulator of a liquid treatment device according to a modified example of the third embodiment.

A modified example which makes it possible to reduce the generation of a swirl within the insulator 50 will be described below with reference to FIG. 22. FIG. 22 is a sectional view illustrating the vicinities of a first electrode 230 and an insulator 50 in this modified example.

As shown in FIG. 22, the liquid treatment device of this modified example includes a tubular portion 332 with a closed bottom and an inlet 335 instead of the screw portion 232 of the first electrode 230. The inlet 335 is, for example, a tubular opening which connects the gas supply pump 60 and the tubular portion 332.

The tubular portion 332 is a tubular member with a closed bottom having the same opening width as the inner diameter of the insulator 50. The tubular portion 332 is a circular tubular member including a space 333 and a circular opening 334, for example. The tubular portion 332 serves as a flowing direction changing unit that changes the traveling direction of the gas 3 supplied from the gas supply pump 60 within the space 333 and stably supplies the gas 3 to the insulator 50.

The tubular portion 332 is provided on the rear side of the insulator 50. More specifically, the tubular portion 332 is connected to the rear side of the insulator 50 such that the tubular portion 332 and the insulator 50 are coaxially positioned. The space 333 of the tubular portion 332 and the space 52 of the insulator 50 communicate with each other and form the flow channel of the gas 3.

As shown in FIG. 22, the opening 334 of the tubular portion 332 is connected to the opening 54 at the rear side of the insulator 50. The openings 54 and 334 have the same configuration and the same size. That is, the tubular portion 332 and the insulator 50 are connected to each other so that the width of the flow channel can be formed substantially uniform.

The tubular portion 332 may be made of an insulating material, for example, more specifically, acrylic resin such as PMMA, PPS, PEEK, alumina ceramic, quartz, magnesia, or zirconia.

The inlet 335 is an opening for guiding the gas 3 supplied from the gas supply pump 60 into the insulator 50. The inlet 335 is not perpendicular to the axial direction of the insulator 50. More specifically, the inlet 335 is provided on the side wall of the tubular portion 332 and is disposed substantially parallel with the axial direction of the insulator 50. In other words, the flowing direction of the gas 3 passing through the inlet 335 (that is, the direction perpendicular to the inlet 335) is substantially perpendicular to the axial direction of the insulator 50. The inlet 335 may be tilted with respect to the axial direction of the insulator 50. That is, the flowing direction of the gas 3 passing through the inlet 335 may intersect with the axial direction of the insulator 50.

The gas 3 supplied into the tubular portion 332 through the inlet 335 has its traveling direction changed within the space 333 of the tubular portion 332 and advances toward the insulator 50. The opening 334 of the tubular portion 332 and the opening 54 at the rear side of the insulator 50 have the same configuration and the same size. Hence, without making the width of the flow channel of the gas 3 discontinuous (nonuniform), the gas 3 travels in the axial direction of the insulator 50 (space 52) and is emitted into the liquid 2 through the opening 51.

In this manner, without the discontinuity of the width of the flow channel of the gas 3 within the insulator 50, the distribution of the flow velocity of the gas 3 within the insulator 50 becomes uniform. A swirl is less likely to be generated within the insulator 50, and thus, the liquid 2 is less likely to enter the insulator 50. As a result, in the liquid treatment device of this modified example, more stable generation of plasma is achieved.

In this modified example, the inlet 335 is provided on the side wall of the tubular portion 332 disposed at the rear side of the insulator 50. Alternatively, the inlet 335 may be provided such that it passes through the side wall of the insulator 50. That is, the insulator 50 may have a tubular shape in which the opening 54 at the rear side is closed, and the inlet 335 may be provided at the side wall of the insulator 50 near the closed opening 54. With this configuration, fewer components are required, thereby implementing a lighter, less expensive liquid treatment device.

In this modified example, the insulator 50 and the tubular portion 332 are directly connected to each other. However, as in the configuration shown in FIG. 16, the first holding portion 235 having a space 236 may be provided between the insulator 50 and the tubular portion 332. In this case, the spaces 333, 236, and 52 have substantially the same diameter, thereby making the width of the flow channel substantially uniform.

Other Embodiments

The liquid treatment devices according to one or plural aspects have been described through illustration of the embodiments. However, the present disclosure is not restricted to the above-described embodiments. Without departing from the spirit of the present disclosure, various modifications apparent to practitioners skilled in the art may be made to the embodiments, and components in the different embodiments may be combined with each other to form other aspects of the disclosure. Such aspects are also encompassed within the scope of the disclosure.

In the above-described embodiments, the position of the end surface of the first electrode is adjustable. For example, in the first embodiment, rotating of the screw portion 32 adjusts the position of the end surface 33 of the first electrode 30. However, the positional relationship between the electrode portion 31 and the insulator 50 may be fixed. More specifically, a female thread may not be formed on the first holding portion 35, and a male thread may not be formed on the screw portion 32.

In the above-described embodiments, the first electrode includes an electrode portion and a screw portion. However, in the first embodiment, for example, the first electrode 30 may be one bar-like (cylindrical) electrode. The first electrode 30 may be a square tubular or flattened electrode. The second electrode 40 may be formed in a similar manner.

In the liquid treatment device 1 of the first embodiment, at least one of the first and second holding portions 35 and 45 may be omitted, and at least one of the first and second electrodes 30 and 40 may directly be fixed to the reaction tank 15.

In the above-described embodiments, the treatment tank 10 and the reaction tank 15 are connected to each other via the piping 20, and the liquid 2 is circulated by the liquid supply pump 70. However, in the liquid treatment device 1, for example, without providing the treatment tank 10 and the piping 20, the plasma 4 may be generated in the still liquid 2 (still water).

In the above-described embodiments, as the liquid 2, tap water containing silica is used. However, purified water or a liquid containing minerals, such as calcium, may be used as the liquid 2.

Various changes, replacements, addition, omission may be made to the above-described embodiments within the spirit of the disclosure defined by the following claims and their equivalents.

The present disclosure is applicable to a liquid treatment device that is able to generate plasma stably, for example, to a sterilizing device and a purifying device.

What is claimed is:

1. A liquid treatment device, comprising:
a first insulator having a tubular shape and including a first opening and a first inner surface, a gas being emitted into a subject liquid through the first opening;
a first electrode that is at least partially disposed within a first space surrounded by the first inner surface;
a second electrode that is at least partially disposed within the subject liquid;
a gas supply source that emits the gas into the subject liquid via the first opening by supplying the gas into the first space; and
a power supply source that generates plasma by applying a voltage between the first and second electrodes, wherein
the first inner surface includes a first partial region which contacts the first opening,
a forward end of the first electrode protrudes from the first opening to outside the first space, or the forward end retreats from the first opening into the first space by less than 3 mm, and
a first distance, which is a shortest distance between an outer surface of the first electrode and the first partial region, is 1 mm or greater.

2. The liquid treatment device according to claim 1, wherein the forward end of the first electrode protrudes from the first opening to outside the first space.

3. The liquid treatment device according to claim 2, wherein the forward end of the first electrode protrudes from the first opening to outside the first space by 1 mm or greater.

4. The liquid treatment device according to claim 2, wherein the forward end of the first electrode retreats from the first opening into the first space by 3 mm or less.

5. The liquid treatment device according to claim 1, wherein:
the first inner surface includes a second partial region which surrounds the first electrode, the second partial region being different from the first partial region; and
the first distance or a shortest distance between the outer surface of the first electrode and the second partial region is a distance which allows an electric field of $1.6 \times 10^6$ V/m or lower to be generated in the first or second partial region by the voltage applied by the power supply source.

6. The liquid treatment device according to claim 1, wherein:
the first inner surface includes a second partial region which surrounds the first electrode, the second partial region being different from the first partial region; and
the first distance or a shortest distance between the outer surface of the first electrode and the second partial region is 2.6 mm or greater.

7. The liquid treatment device according to claim 6, wherein the first distance or the shortest distance between the outer surface of the first electrode and the second partial region is 5 mm or greater.

8. The liquid treatment device according to claim 1, wherein the first distance is 1 to 3 mm.

9. The liquid treatment device according to claim 1, wherein a flow rate of the gas supplied from the gas supply source is 0.5 L/min or greater.

10. The liquid treatment device according to claim 1, wherein:
the first electrode includes an elongated cylindrical electrode portion;
the first insulator is an elongated circular tubular member which surrounds the outer surface of the electrode portion; and
the electrode portion and the first insulator are coaxially disposed.

11. The liquid treatment device according to claim 1, the first electrode including:
an elongated cylindrical electrode portion having a forward end on a downstream side in a flowing direction of the gas and a rear end on an upstream side in the flowing direction of the gas, and
a cylindrical support portion that is disposed on a side of the rear end of the electrode portion and supports the electrode portion, the support portion being thicker than the electrode portion, wherein
the first insulator is a circular tubular member,
the support portion includes a gas supply hole which allows the gas supplied from the gas supply source to pass through the gas supply hole, and
an opening width of the gas supply hole and an inner diameter of the first insulator are substantially the same.

12. The liquid treatment device according to claim 1, further comprising:
a pipe including an inlet for guiding the gas supplied from the gas supply source into the first space,
wherein a flowing direction of the gas passing through the inlet intersects with an axial direction of the first insulator.

13. The liquid treatment device according to claim 12, further comprising:
a tubular member having a third opening and a closed end on a side opposite the third opening, wherein
the first insulator has a second opening on a side opposite the first opening,
a width of the third opening is substantially the same as a width of the second opening, and the third opening and the second opening are connected to each other such that the tubular member and the first insulator are coaxially disposed, and
the inlet is provided at a side wall of the tubular member.

14. The liquid treatment device according to claim 1, further comprising:
a second insulator having a tubular shape and including a second inner surface which surrounds the outer surface of the first electrode via a second space, wherein
the first insulator has a second opening on a side opposite the first opening,
the second insulator is connected to the second opening of the first insulator such that the second space and the first space communicate with each other, and
a second distance, which is a shortest distance between the outer surface of the first electrode and the second inner surface, is greater than the first distance.

15. The liquid treatment device according to claim 14, wherein the second distance is a distance which allows an electric field of $1.6 \times 10^6$ V/m or lower to be generated on the second inner surface by the voltage applied by the power supply source.

16. The liquid treatment device according to claim 14, wherein:
the voltage applied between the first and second electrodes is 5 kV or lower; and
the second distance is 2.6 mm or greater.

17. The liquid treatment device according to claim 14, wherein:
the voltage applied between the first and second electrodes is 5 kV or higher; and
the second distance is 5 mm or greater.

18. The liquid treatment device according to claim 14, wherein:
the first electrode includes an elongated cylindrical electrode portion having a forward end on a downstream side in a flowing direction of the gas and a rear end on an upstream side in the flowing direction of the gas;
the first insulator is a circular tubular member which surrounds an outer surface on a side of the forward end of the electrode portion;
the second insulator is a tubular member which surrounds an outer surface on a side of the rear end of the electrode portion; and
the electrode portion and the first and second insulators are coaxially disposed.

19. The liquid treatment device according to claim 18, wherein the second insulator is a circular tubular member or a square tubular member.

20. The liquid treatment device according to claim 14, wherein a material for the first insulator is different from a material for the second insulator.

21. The liquid treatment device according to claim 14, wherein a material for the first insulator is the same as a material for the second insulator, and the first insulator is formed integrally with the second insulator.

* * * * *